(12) United States Patent
Babu et al.

(10) Patent No.: US 11,259,354 B2
(45) Date of Patent: *Feb. 22, 2022

(54) APPARATUS, SYSTEM, AND METHOD FOR PERFORMING GUTI REALLOCATION

(71) Applicant: Apple Inc., Cupertino, CA (US)

(72) Inventors: Shivani Suresh Babu, San Jose, CA (US); Lakshmi N. Kavuri, San Jose, CA (US); Krisztian Kiss, Hayward, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/995,296

(22) Filed: Aug. 17, 2020

(65) Prior Publication Data

US 2020/0383159 A1 Dec. 3, 2020

Related U.S. Application Data

(63) Continuation of application No. 16/225,271, filed on Dec. 19, 2018, now Pat. No. 10,805,973.

(60) Provisional application No. 62/631,201, filed on Feb. 15, 2018.

(51) Int. Cl.
*H04W 76/15* (2018.01)
*H04L 12/24* (2006.01)
*H04L 41/0816* (2022.01)

(52) U.S. Cl.
CPC ......... *H04W 76/15* (2018.02); *H04L 41/0816* (2013.01)

(58) Field of Classification Search
CPC combination set(s) only.
See application file for complete search history.

(56) References Cited

U.S. PATENT DOCUMENTS

| 9,699,694 | B2 | 7/2017 | Poikonen | |
| 9,832,714 | B2 | 11/2017 | Kant | |
| 10,003,957 | B2 | 6/2018 | Hahn | |
| 10,375,665 | B2* | 8/2019 | Li | H04W 60/04 |
| 10,805,973 | B2* | 10/2020 | Babu | H04W 76/11 |
| 2011/0189971 | A1 | 8/2011 | Faccin et al. | |
| 2014/0016614 | A1 | 1/2014 | Velev et al. | |
| 2015/0046824 | A1 | 2/2015 | Humphrey | |
| 2017/0318452 | A1* | 11/2017 | Hahn | H04W 8/26 |
| 2019/0159157 | A1 | 5/2019 | Gupta | |
| 2020/0267634 | A1* | 8/2020 | Kim | H04W 8/08 |
| 2020/0404734 | A1* | 12/2020 | Watfa | H04W 76/30 |

* cited by examiner

*Primary Examiner* — Xavier S Wong
(74) *Attorney, Agent, or Firm* — Kowert, Hood, Munyon, Rankin & Goetzel, P.C.

(57) ABSTRACT

Apparatuses, systems, and methods for refreshing a GUTI of a UE. The UE may receive a GUTI from an AMF as part of a registration process. After a timer has expired, the UE may receive a new GUTI from the AMF. The timer may be provided by the UE as a request for use by the AMF. Alternatively, the timer may be used by the UE and the UE may request the new GUTI upon expiry of the timer, e.g., using an existing message or a new message, as desired.

20 Claims, 11 Drawing Sheets

APPARATUS, SYSTEM, AND METHOD FOR PERFORMING GUTI REALLOCATION

PRIORITY CLAIM

This application is continuation of U.S. patent application Ser. No. 16/225,271 titled "Apparatus, System, and Method for Performing GUTI Reallocation," filed Dec. 19, 2018 which claims priority to U.S. provisional application Ser. No. 62/631,201 titled "Apparatus, System, and Method for Performing GUTI Reallocation," filed Feb. 15, 2018, which is hereby incorporated by reference in its entirety as though fully and completely set forth herein.

FIELD

The present application relates to wireless devices, and more particularly to apparatus, systems, and methods for a wireless device to establish and maintain concurrent connections with current radio access technologies and next generation radio access technologies.

DESCRIPTION OF THE RELATED ART

Wireless communication systems are rapidly growing in usage. Further, wireless communication technology has evolved from voice-only communications to also include the transmission of data, such as Internet and multimedia content. Additionally, security has become increasingly important in wireless communication, particularly where communication flows are can be hijacked. Thus, improvements in the field are desired.

SUMMARY

Embodiments relate to apparatuses, systems, and methods to perform global unique temporary identifier (GUTI) reallocation for a wireless device.

The UE may receive a GUTI from an access mobility function (AMF) as part of a registration process. After a period of time, the UE may transmit a second message to receive a new GUTI from the network node. In response to transmitting the second message to receive the new GUTI, the UE may receive a second GUTI from the network node.

In some embodiments, the UE may initiate a timer associated with the first GUTI upon receiving the first GUTI. Additionally, transmitting the second message to receive the new GUTI after the first period of time may be performed upon or after expiry of the timer. In some embodiments, transmitting the second message may be performed while the UE is in connected mode. For example, the UE may not be in connected mode after expiry of the timer and transmitting the second message may be performed upon entering connected mode after expiry of the timer.

In some embodiments, the second message to request the new GUTI may be a status message. In some embodiments, the second message to request the new GUTI may be a configuration update request message. In some embodiments, the second GUTI may be received in a configuration update command from the network node.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
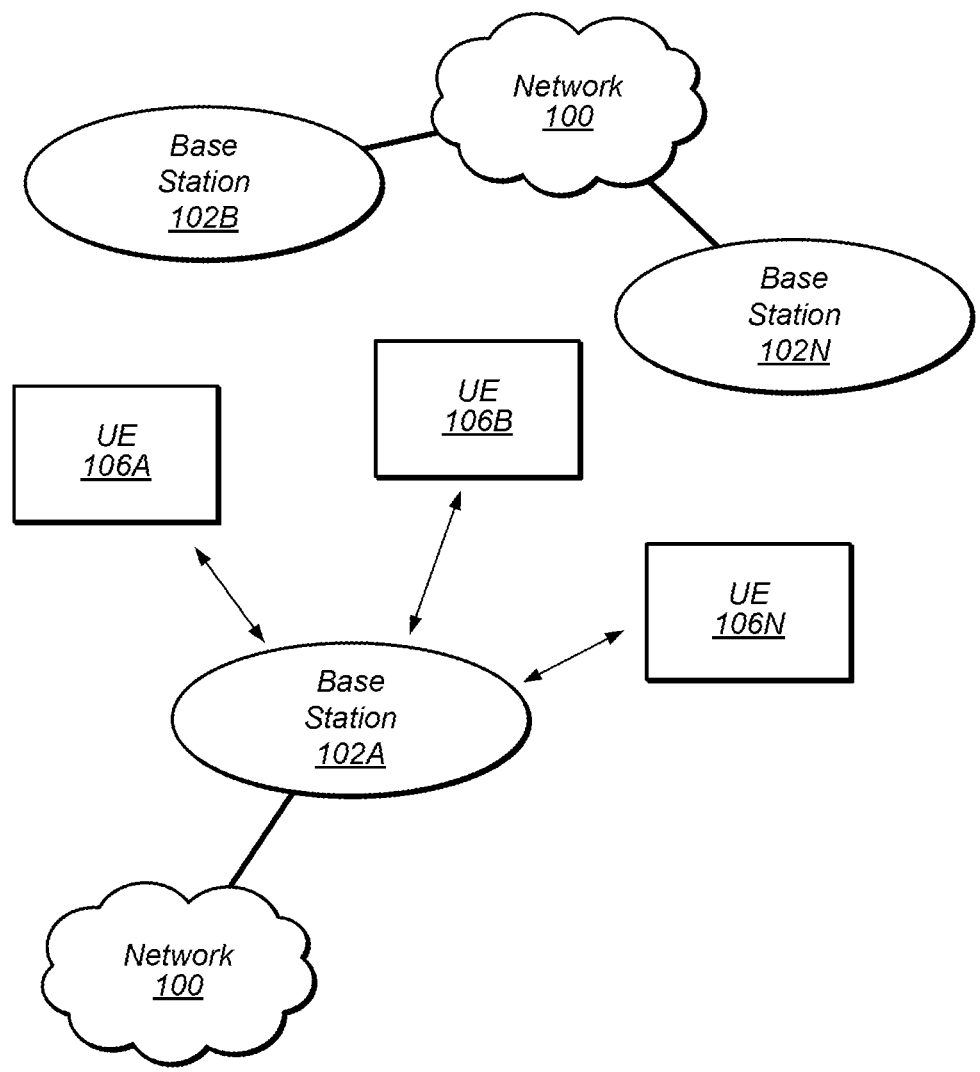
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
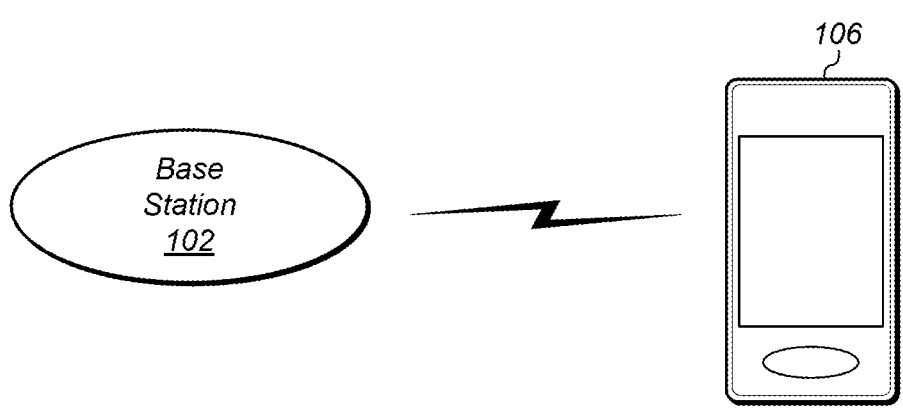
FIG. 2 illustrates a base station (BS) in communication with a user equipment (UE) device according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B ... 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
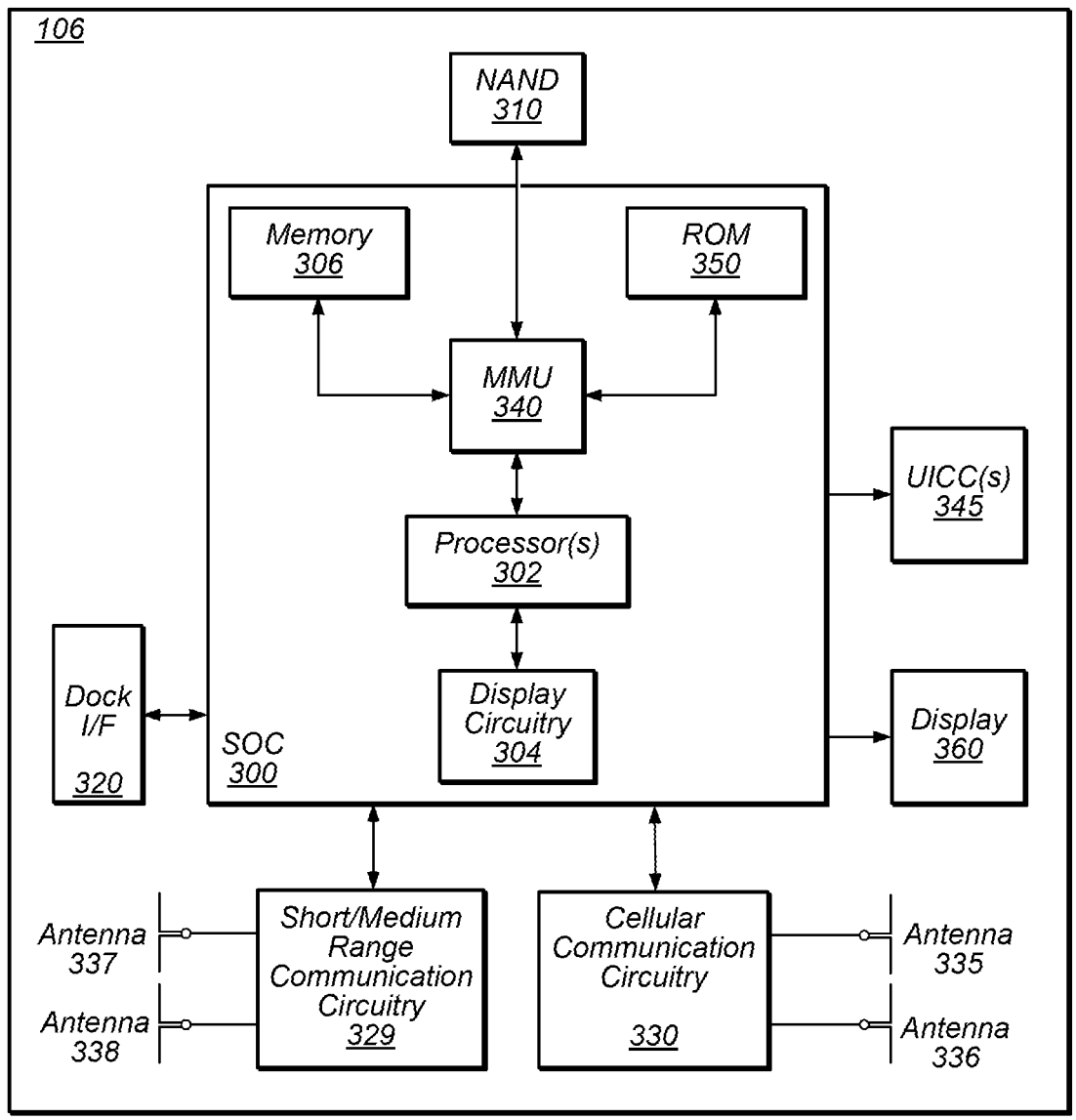
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity with the first and second network nodes has been established.

As described herein, the communication device 106 may include hardware and software components for implementing the above features for time division multiplexing UL data for NSA NR operations. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
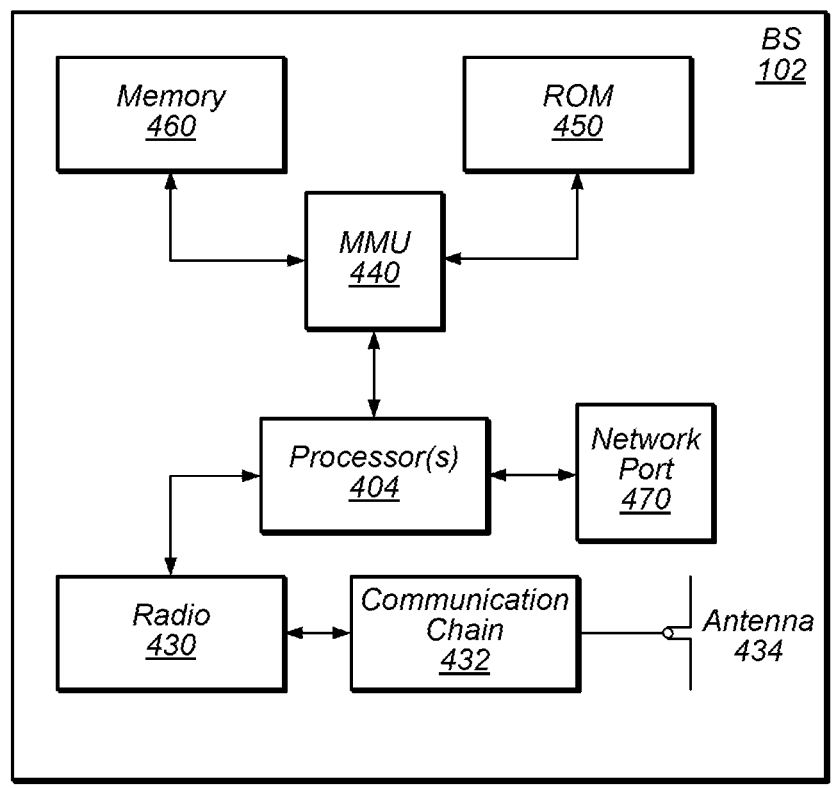
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
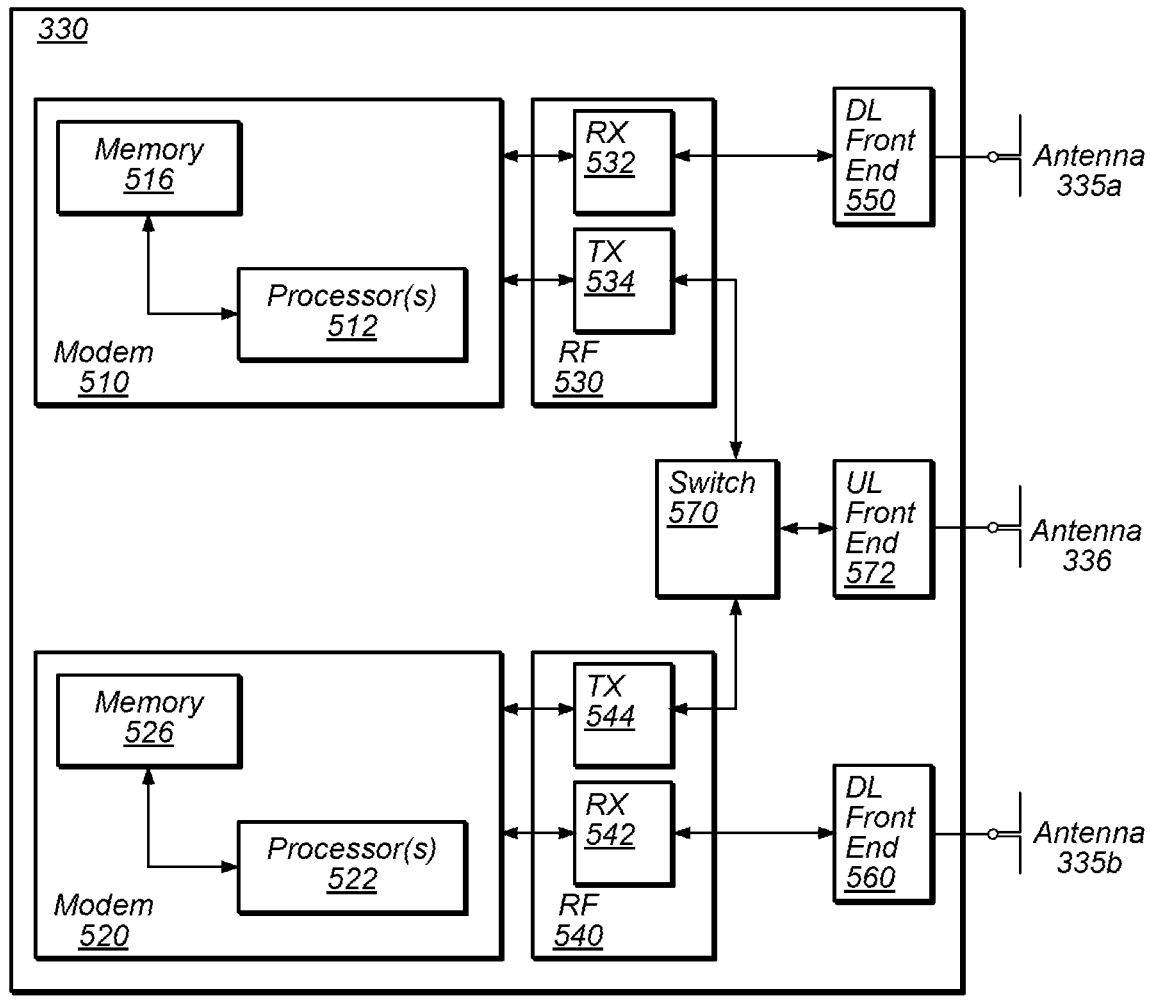
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to establish a first wireless link with a first cell according to a first radio access technology (RAT), wherein the first cell operates in a first system bandwidth and establish a second wireless link with a second cell according to a second radio access technology (RAT), wherein the second cell operates in a second system bandwidth. Further, the cellular communication circuitry 330 may be configured to determine whether the cellular communication circuitry 330 has uplink activity scheduled according to both the first RAT and the second RAT and perform uplink activity for both the first RAT and the second RAT by time division multiplexing (TDM) uplink data for the first RAT and uplink data for the second RAT if uplink activity is scheduled according to both the first RAT and the second RAT. In some embodiments, to perform uplink activity for both the first RAT and the second RAT by time division multiplexing (TDM) uplink data for the first RAT and uplink data for the second RAT if uplink activity is scheduled according to both the first RAT and the second RAT, the cellular communication circuitry 330 may be configured to receive an allocation of a first UL subframe for transmissions according to the first RAT and an allocation of a second UL subframe for transmissions according to the second RAT. In some embodiments, the TDM of the uplink data may be performed at a physical layer of the cellular communication circuitry 330. In some embodiments, the cellular communication circuitry 330 may be further configured to receive an allocation of a portion of each UL subframe for control signaling according to one of the first or second RATs.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for time division multiplexing UL data for NSA NR operations, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Non-Standalone (NSA) Operation with LTE

Figure 6A:
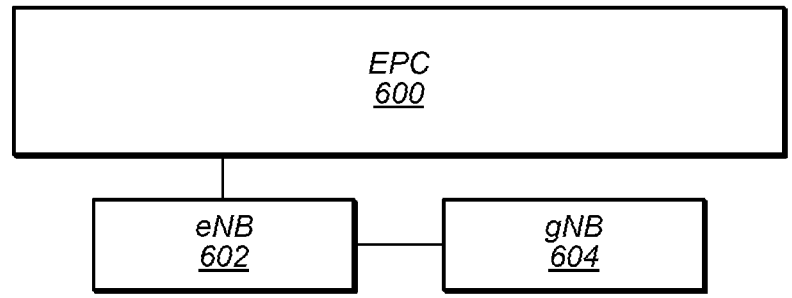
FIG. 6A illustrates an example of connections between an EPC network, an LTE base station (eNB), and a 5G NR base station (gNB).
Figure 6B:
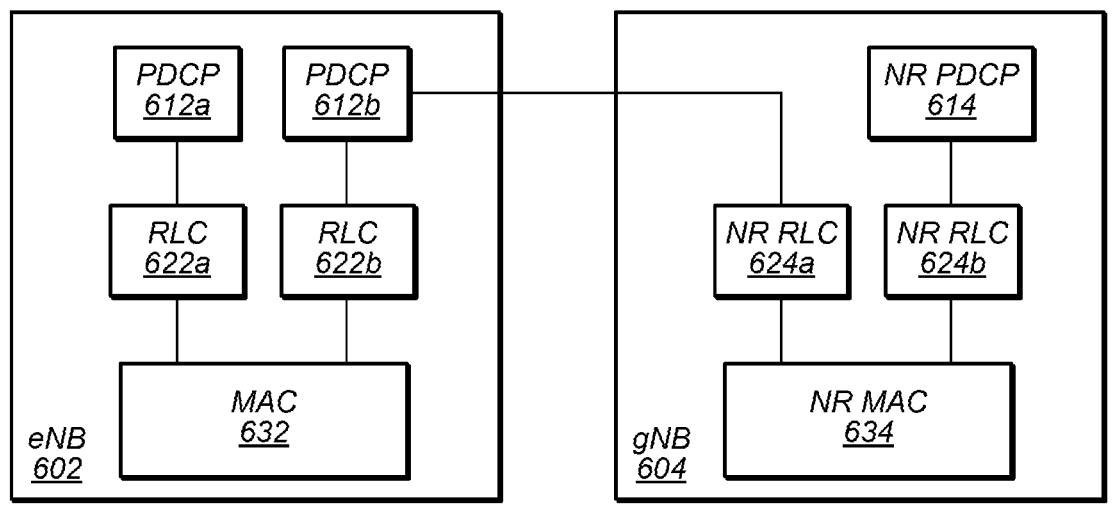
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622*a-b*. RLC layer 622*a* may also interface with packet data convergence protocol (PDCP) layer 612*a* and RLC layer 622*b* may interface with PDCP layer 612*b*. Similar to dual connectivity as specified in LTE-Advanced Release 12, PDCP layer 612*a* may interface via a master cell group (MCG) bearer to EPC network 600 whereas PDCP layer 612*b* may interface via a split bearer with EPC network 600.

Additionally, as shown, gNB 604 may include a MAC layer 634 that interfaces with RLC layers 624*a-b*. RLC layer 624*a* may interface with PDCP layer 622*b* of eNB 602 via an $X_2$ interface for information exchange and/or coordination (e.g., scheduling of a UE) between eNB 602 and gNB 604. In addition, RLC layer 624*b* may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

In general, a non-stand alone (NSA) implementation employs dual connectivity in both uplink (UL) and downlink (DL). In other words, dual connectivity requires two active radio links in both UL and DL. In some implementations, depending on frequency band combinations, two (substantially) concurrent UL connections may cause receiver sensitivity degradation at the UE. For example, in some proposed implementations, a UE may be required to support 4 DL and 1 UL connection in LTE on bands 1 (UL: 1920-1980 MHz, DL: 2110-2170 MHz), 3 (UL: 1710-1785 MHz, DL: 1805-1880 MHz), 7 (UL: 2500-2570 MHz, DL: 2620-2690 MHz), and 20 (UL: 832-862 MHz, DL: 791-821 MHz) while (substantially) concurrently supporting 1 DL and 1 UL connection in NR at 3400-3800 MHz. In such implementations, a $5^{th}$ order intermodulation product (IM5) produced at a 5G NR transmitter of the UE from a $2^{nd}$ harmonic of LTE UL band 3 and NR UL may fall into LTE DL band 7 frequencies during (substantially) simultaneous UL operation. Similarly, a $4^{th}$ order harmonic of LTE UL band 20 and NR UL transmission may create a $5^{th}$ order intermodulation product that may interfere with LTE DL band 7 reception and thus desensitize a receiving for LTE DL band 7.

In addition, future specifications of NR NSA may require a UE to support co-existence of LTE UL and NR UL within the bandwidth of an LTE component carrier and co-existence of LTE DL and NR DL within the bandwidth of an LTE component carrier. Further, such an implementation may be further required to minimize impact to NR physical layer design to enable such co-existence and to not impact LTE legacy devices (e.g., devices that do not support NR) operating on an LTE carrier co-existing with NR.

Thus, in some implementations of NR NSA, a UE may be configured with multiple UL carriers on different frequencies (e.g., where there is at least one LTE carrier and at least one NR carrier of a different carrier frequency) but operate on either the LTE carrier or the NR carrier at a given time. In other words, the UE may be configured to operate on only one of the carriers at a given time among a pair of LTE and NR carriers. Note that such an implementation may also allow for (substantially) simultaneous operation on two or more UL carriers at a given time.

Embodiments described herein define systems, methods, and mechanisms for a UE to support 5G NSA.

GUTI Reallocation

A global unique temporary ID (GUTI) may be used as a temporary identifier for UEs, e.g., within a 5G NR network. As used herein, a GUTI may include "5G-GUTI", but may also include other GUTIs, e.g., used in future standard specifications. In some embodiments, the network (e.g., the AMF) may allocate a GUTI to the UE that is common to both 3GPP and non-3GPP access. Accordingly, it may be possible to use the same GUTI for accessing 3GPP access and non-3GPP access security contexts within the AMF for a given UE.

As one example, a 5G-GUTI may be structured as: <5G-GUTI>=<GUAMI> <5G-TMSI> where GUAMI identifies the assigned AMF and 5G-TMSI identifies the UE uniquely within the AMF, although other variations are envisioned. In one embodiment, the Globally Unique AMF ID (GUAMI) may be structured as: <GUAMI>=<MCC> <MNC> <AMF Region ID> <AMF Set ID> <AMF Pointer> where AMF Region ID identifies the region, AMF Set ID uniquely identifies the AMF Set within the AMF Region and AMF Pointer uniquely identifies the AMF within the AMF Set. Note that the AMF Region ID may address the case where there are more AMFs in the network than the number of AMFs that can be supported by AMF Set ID and AMF Pointer by enabling operators to re-use the same AMF Set IDs and AMF Pointers in different regions. The 5G-S-TMSI may be the shortened form of the GUTI to enable more efficient radio signaling procedures (e.g. during Paging and Service Request) and may be defined as: <5G-S-TMSI>=<AMF Set ID> <AMF Pointer> <5G-TMSI>. Various embodiments discussed herein regarding the GUTI may also apply to the 5G-S-TMSI, as desired.

A GUTI may be allocated or reallocated during "initial", "mobility", and "periodic" registration attempts. In some embodiments, this may be mandatory according to a wireless communication spectrum. For example, TS 33.501 section 6.12.3 states: "Upon receiving Registration Request message of type 'initial registration' or 'mobility registration update' from a UE, the AMF shall send a new 5G-GUTI to the UE in Registration Accept message", and "Upon receiving Registration Request message of type "periodic registration update" from a UE, the AMF should send a new 5G-GUTI to the UE in Registration Accept message."

However, in some instances, these allocations may not occur often. For example, many UEs may stay in 5GMM connected mode, or may go in and out of connected mode frequently, thereby not initiating a periodic registration procedure for a long time due to T3512 timer reset. For example, according to TS 24.501 section 5.3.5: "if the UE is in 5GMM-CONNECTED mode or 5GMM-CONNECTED mode with RRC inactive indication over 3GPP access, the UE shall not perform the registration procedure for mobility and periodic registration update with Uplink data status IE except for emergency services or for high priority access;". Additionally, UEs may not perform periodic registration while connected to 5GC over non-3GPP access. For example, according to TS 24.501 section 5.3.7: "The UE does not perform the periodic registration update procedure for non-3GPP access.". Operating in this manner may cause fewer periodic registration attempts, leading to GUTI persistence and hence device tracking. Because of this GUTI persistence, various security hacks or hijacking may be performed on the network and/or UE, which may invade the UE user's privacy.

In some embodiments, a new GUTI may be allocated by the network (apart from initial, periodic, UE triggered service requests, and NW triggered service requests) only by using a UE configuration update procedure. This procedure may be initiated by the network and is currently optional. In one embodiment, this procedure may be made mandatory. For example, TS 24.501 section 5.4.4.1: "The procedure may be initiated by the network and can only be used when the UE has an established 5GMM context, and the UE is in 5GMM-CONNECTED mode." Alternatively, or additionally, various embodiments discussed below provide methods for refreshing the GUTI, which may help alleviate this persistence.

Figure 7:
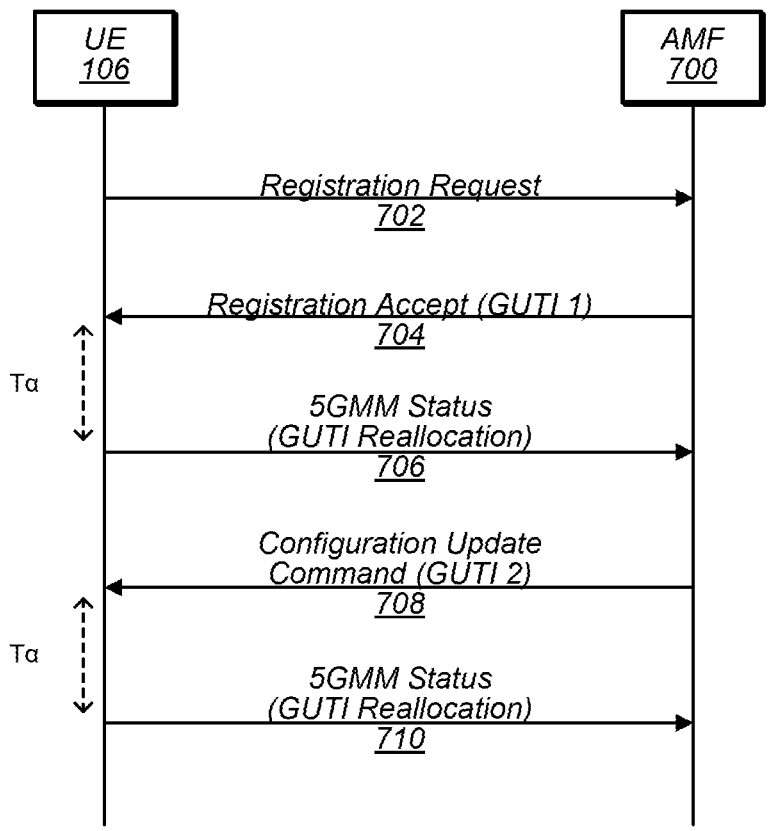
FIGS. 7-9 are flowchart diagrams illustrating exemplary methods for performing GUTI reallocation.

FIG. 7—GUTI Refresh Using UE Message

FIG. 7 is a flowchart diagram illustrating a method for requesting a new GUTI using a UE message (e.g., a status message, such as a 5GMM status message). Aspects of the method of FIG. 7 may be implemented by a wireless device, a base station, and/or a network, such as a UE 106, the BS 102, and/or the network 100 (e.g., a 5G AMF) illustrated in and described with respect to various of the Figures herein, or more generally in conjunction with any of the computer systems or devices shown in the above Figures, among other devices, as desired. In various embodiments, some of the elements of the methods shown may be performed concurrently, in a different order than shown, may be substituted for by other method elements, or may be omitted. Additional method elements may also be performed as desired. As shown, the method of FIG. 7 may operate as follows.

In 702, the UE 106 may transmit a request to the network. In the embodiment shown in FIG. 7, the registration request is sent to the AMF 700, although it may be transmitted to the AMF 700 via any of various entities, such as a BS, access point, etc. Moreover, while AMF 700 is shown in FIG. 7, any of various network entities may perform these steps. In one embodiment, the UE 106 may transmit the registration request as part of a registration or initial connection procedure. Although FIG. 7 illustrates the message as a registration request, it could be a different message.

In 704, in response to the request in 702, the AMF 700 may transmit a registration accept or configuration update command by including the first GUTI assigned by the network. The UE may acknowledge the new GUTI depending on the type of message received from the AMF. For example, a registration complete message may be transmitted in a response to a registration accept or a configuration update complete message may be transmitted in response to a configuration update command message, among other possibilities.

In some embodiments, the UE 106 may be configured to start a timer (shown as Tα in FIG. 7) when a new GUTI is assigned to the UE 106. The value of the timer may vary from implementation to implementation. In one embodiment, the timer could be on the order of 6 minutes. In some embodiments, the timer value may be set by the UE or may be configured by the network (e.g., indicated in a message from the AMF 700). The value of the timer may be static (e.g., having the same value from one instance to another) or may be dynamic (e.g., changing based on the various current conditions). For example, in various embodiments, the value of the timer may be based on various factors, such as the degree of mobility of the UE 106 (e.g., static, mobile, or various states or movement speeds in between) and/or the type of UE 106 (e.g., eMBB (enhanced mobile broadband), MTC (machine type communication), URLLC (ultra-reliable low latency communication), etc.). The timer may also be based on other factors, as desired.

In 706, upon expiry of the timer, e.g., if the UE 106 is in 5GMM-CONNECTED mode in 5GC over 3GPP or in non-3GPP access, the UE 106 may send a message requesting GUTI reallocation, e.g., in a status message such as a 5GMM Status message. In one embodiment, the message may include a new 5GMM cause value (e.g., "GUTI reallocation") to trigger a UE configuration update procedure by the AMF 700 to provide a new GUTI to the UE. Thus, in 706, the UE may use an existing message (e.g., the 5GMM status message) but with a cause value that is new relative to current standards. This cause value may indicate to the AMF 700 that the UE is requesting GUTI reallocation. This new cause value may also be used by the UE to negotiate other parameters with the network (e.g., allowed NSSAI, among other possibilities).

Note that in some embodiments, the UE may not be in connected mode at the time of the timer's expiry. Accordingly, the UE may be configured to send the message in 706 the next time the UE is in connected mode. The UE may be configured to send the message at other times, if desired. Thus, in some embodiments, the UE may not send the message immediately at the expiry of the timer, but may wait for another trigger (e.g., entering connected mode, although other triggers are envisioned).

In 708, the AMF 700 may respond to the message (e.g., the status message) in 706 by providing a response (e.g., shown as a "configuration update command" in FIG. 7, although other types of messages are envisioned), which may indicate or include a second GUTI that is different from the first GUTI provided in 704. Note that if the AMF 700 does not send a response (or it is not received by the UE 106) in a timely manner, the UE 106 may retry after a period of time. In one embodiment, it may retry after the timer value has expired again.

In 710, the GUTI reallocation process of 706 and 708 may repeat after the timer value has expired again. The timer value may be the same or change in different repetitions, as desired.

Figure 8:
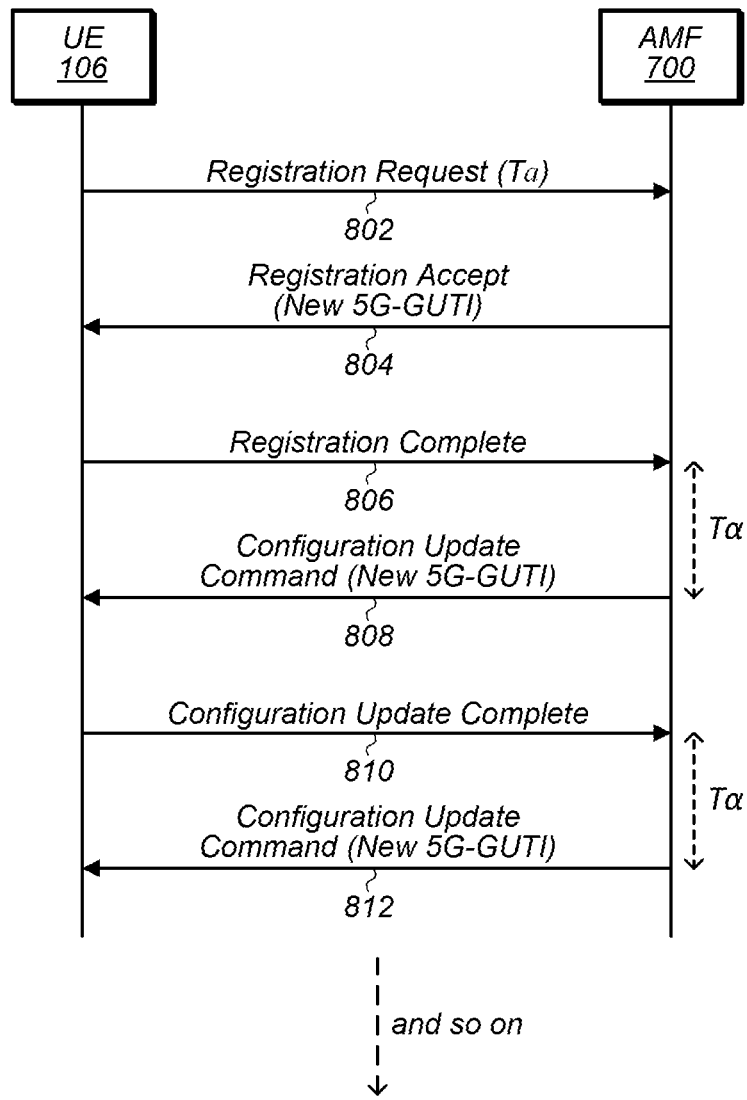

FIG. 8—GUTI Refresh Using Requested Timer

FIG. 8 is a flowchart diagram illustrating a method for refreshing GUTI based on a requested timer. Aspects of the method of FIG. 8 may be implemented by a wireless device, a base station, and/or a network, such as a UE 106, the BS 102, and/or the network 100 (e.g., a 5G AMF) illustrated in and described with respect to various of the Figures herein, or more generally in conjunction with any of the computer systems or devices shown in the above Figures, among other devices, as desired. In various embodiments, some of the elements of the methods shown may be performed concurrently, in a different order than shown, may be substituted for by other method elements, or may be omitted. Additional method elements may also be performed as desired. As shown, the method of FIG. 8 may operate as follows.

In 802, the UE 106 may transmit a request to the network. In the embodiment shown in FIG. 8, the registration request is sent to the AMF 700, although it may be transmitted to the AMF 700 via any of various entities, such as a BS, access point, etc. Moreover, while AMF 700 is shown in FIG. 8 any of various network entities may perform these steps. In one embodiment, the UE 106 may transmit the registration request as part of a registration or initial connection procedure. Although FIG. 8 illustrates the message as a registration request, it could be a different message.

According to the embodiment of FIG. 8, the request may include a timer value (shown as Ta) that may be similar to the timer value discussed above in FIG. 7. In the embodiment of FIG. 8, the timer value may be used by the AMF 700 to determine when to reallocate a new GUTI for the UE 102.

In 804, in response to the request in 802, the AMF 700 may transmit a registration accept or configuration update command by including the first GUTI assigned by the network. The UE may acknowledge the new GUTI depending on the type of message received from the AMF. For example, a registration complete message may be transmitted in a response to a registration accept or a configuration update complete message may be transmitted in response to a configuration update command message, among other possibilities.

In some embodiments, the registration accept message of 804 may include a confirmation of the timer value or may indicate an adjusted timer value that the AMF 700 will use for GUTI reallocation. For example, the AMF 700 may be configured to modify the timer value when the timer value is inappropriate or outside of allowed values for the AMF 700. Thus, the request 802 and response 804 may be part of a negotiation of the timer value between the UE 102 and the AMF 700. In some embodiments, the timer value may be the one requested by the UE 102, modified only when outside of acceptable bounds of the network, and/or set according to network or network standard values, as desired.

Similar to discussions above, the value of the timer may vary from implementation to implementation. In one embodiment, the timer could be on the order of 6 minutes. In various embodiments, the value of the timer may be based on various factors, such as the degree of mobility of the UE 106 (e.g., static, mobile, or various states or movement speeds in between) and/or the type of UE 106 (e.g., eMBB (enhanced mobile broadband), MTC (machine type communication), URLLC (ultra-reliable low latency communication), etc.). The timer may also be based on other factors, as desired. Absent a specified timer value, the timer may have a default value, e.g., on the order of 54 minutes, depending on the implementation. Note that these provided timer values are exemplary only and are not intended to limit the embodiments described herein.

In 806, the UE may respond to the registration accept message with a registration complete message or acknowledgement message to acknowledge that a new GUTI was received (although other types of messages are envisioned). In some embodiments, this message may also be a part of the timer negotiation process, although confirmation may not be necessary. In response to the message, the AMF 700 may begin the timer.

In 808, upon expiry of the timer, the AMF 700 may provide a new message (e.g., a configuration update command) that indicates a new GUTI value for the UE 102. Note that the message may be sent as long as the UE is in connected mode; however, if the UE is not in connected mode at the time of expiry of the timer, the AMF 700 may send the new GUTI in a message when the UE again enters connected mode.

In 810, the UE 102 may provide a response to the message 808, e.g., a configuration update complete, which may acknowledge the new GUTI value. This reallocation process may continue using the timer value as shown in 812.

Thus, in one embodiment, FIG. 8 may allow the UE to request the AMF to periodically re-allocate the GUTI. The UE requested GUTI expiration time may be based on the Requested NSSAI (network slice selection assistance information). If the GUTI expiration time is requested by the UE, the AMF may periodically re-allocate the GUTI, and it may adjust the UE requested GUTI expiration time to a network accepted value. An AMF may re-assign a new 5G-GUTI to the UE at any time. In some embodiments, the AMF may delay updating the UE with its new GUTI until the next NAS transaction, as desired.

The timer value may be used for further periodic GUTI reallocations. In some embodiments, the timer value may be the same throughout a session or registration of the UE 102. However, in other embodiments, the timer value may be more dynamic and may change one or more times throughout the session or registration of the UE 102, e.g., based on changing conditions (such as UE mobility, network conditions, network load, etc.).

Figure 9:
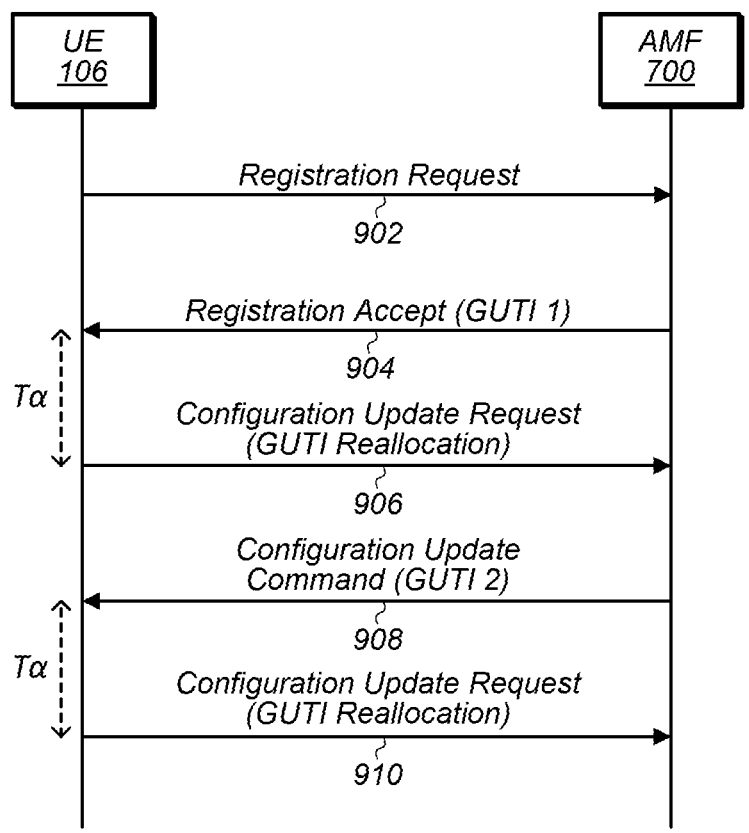

FIG. 9—GUTI Refresh Using New UE Message

FIG. 9 is a flowchart diagram illustrating a method for requesting a new GUTI using a new UE message (e.g., a configuration update message). Aspects of the method of FIG. 9 may be implemented by a wireless device, a base station, and/or a network, such as a UE 106, the BS 102, and/or the network 100 (e.g., a 5G AMF) illustrated in and described with respect to various of the Figures herein, or more generally in conjunction with any of the computer systems or devices shown in the above Figures, among other devices, as desired. In various embodiments, some of the elements of the methods shown may be performed concurrently, in a different order than shown, may be substituted for by other method elements, or may be omitted. Additional method elements may also be performed as desired. As shown, the method of FIG. 9 may operate as follows.

In 902, the UE 106 may transmit a request to the network. In the embodiment shown in FIG. 9, the registration request is sent to the AMF 700, although it may be transmitted to the AMF 700 via any of various entities, such as a BS, access point, etc. Moreover, while AMF 700 is shown in FIG. 9 any of various network entities may perform these steps. In one embodiment, the UE 106 may transmit the registration request as part of a registration or initial connection procedure. Although FIG. 9 illustrates the message as a registration request, it could be a different message.

In 904, in response to the request in 702, the AMF 700 may transmit a registration accept or configuration update command by including the first GUTI assigned by the network. The UE may acknowledge the new GUTI depending on the type of message received from the AMF. For example, a registration complete message may be transmitted in a response to a registration accept or a configuration update complete message may be transmitted in response to a configuration update command message, among other possibilities.

In some embodiments, the UE 106 may be configured to start a timer (shown as Tα in FIG. 9) when a new GUTI is assigned to the UE 106. The value of the timer may vary from implementation to implementation. In one embodiment, the timer could be on the order of 6 minutes. In some embodiments, the timer value may be set by the UE or may be configured by the network (e.g., indicated in a message from the AMF 700). The value of the timer may be static (e.g., having the same value from one instance to another) or may be dynamic (e.g., changing based on the various current conditions). For example, in various embodiments, the value of the timer may be based on various factors, such as the degree of mobility of the UE 106 (e.g., static, mobile, or various states or movement speeds in between) and/or the type of UE 106 (e.g., eMBB (enhanced mobile broadband), MTC (machine type communication), URLLC (ultra-reliable low latency communication), etc.). The timer may also be based on other factors, as desired.

In 906, upon expiry of the timer, e.g., if the UE 106 is in 5GMM-CONNECTED mode in 5GC over 3GPP or non-3GPP access, the UE 106 may send a message requesting GUTI reallocation, e.g., in configuration update request message, which may have a cause value of "GUTI reallocation". Thus, rather than reusing an old message and using a new cause value, as described in FIG. 7, FIG. 9 may use a new configuration update message. This new message can also be used by the UE to negotiate other parameters with the network (e.g., allowed NSSAI, among other possibilities).

Note that in some embodiments, the UE may not be in connected mode at the time of the timer's expiry. Accordingly, the UE may be configured to send the message in 906 the next time the UE is in connected mode. The UE may be configured to send the message at other times, if desired. Thus, in some embodiments, the UE may not send the message immediately at the expiry of the timer, but may wait for another trigger (e.g., entering connected mode, although other triggers are envisioned).

In 908, the AMF 700 may respond to the message (e.g., the status message) in 906 by providing a response (e.g., shown as a "configuration update command" in FIG. 9), which may indicate a second GUTI that is different from the first GUTI provided in 904. Note that if the AMF 700 does not send a response (or it is not received by the UE 106) in a timely manner, the UE 106 may retry after a period of time. In one embodiment, it may retry after the timer value has expired again.

In 910, the GUTI reallocation process of 906 and 908 may repeat after the timer value has expired again. The timer value may be the same or change in different repetitions, as desired.

5G Embodiments

The following text provide specific embodiments related to 5G, which is not intended to limit any of the other embodiments described herein.

Figure 10:
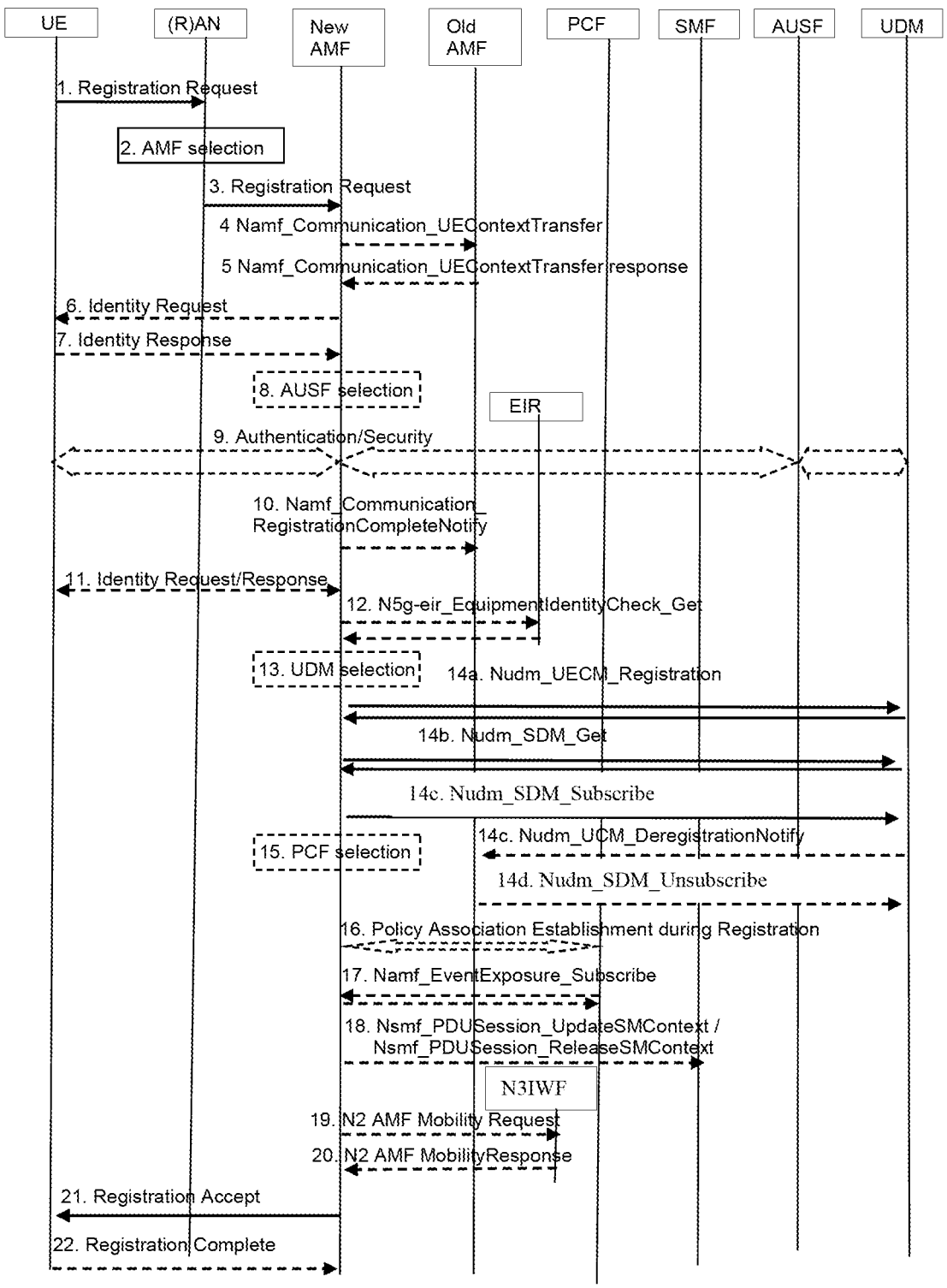
FIGS. 10-12 are message diagrams illustrating some embodiments related to 5G NR.

FIG. 10 illustrates an exemplary registration procedure. At 1: UE to (R)AN: AN message (AN parameters, RM-NAS Registration Request (Registration type, SUCI or SUPI or 5G-GUTI, 5G-GUTI expiration time, last visited TAI (if available), Security parameters, Requested NSSAI, Mapping Of Requested NSSAI, UE 5GC Capability, PDU Session status, PDU Session(s) to be re-activated, Follow on request, and MICO mode preference)).

In case of NG-RAN, the AN parameters may include e.g. SUCI or SUPI or the 5G-GUTI, the Selected PLMN ID and Requested NSSAI, the AN parameters may also include Establishment cause. The Establishment cause may provide the reason for requesting the establishment of an RRC connection. The 5G-GUTI expiration time may include a proposed value for the expiration time of the 5G-GUTI returned in 21. The 5G-GUTI expiration time can be based on the Requested NSSAI.

The Registration type may indicate if the UE wants to perform an Initial Registration (i.e. the UE is in RM-DEREGISTERED state), a Mobility Registration Update (i.e. the UE is in RM-REGISTERED state and may initiate a Registration procedure due to mobility), a Periodic Registration Update (i.e. the UE is in RM-REGISTERED state and may initiate a Registration procedure due to the Periodic Registration Update timer expiry, see clause 4.2.2.2.1) or an Emergency Registration (i.e. the UE is in limited service state). The UE performing an Initial Registration (i.e., the UE is in RM-DEREGISTERED state) to a PLMN for which the UE does not already have a 5G-GUTI, the UE may include its SUCI or SUPI in the Registration Request. The SUCI may be included if and only if the home network has provisioned the public key to protect SUPI in the UE (e.g., as defined in TS 33.501 [15]). If the UE previously received a UE Configuration Update Command indicating that the UE needs to re-register and the 5G-GUTI is invalid, the UE may perform an Initial Registration and shall include the SUPI in the Registration Request message. For an Emergency Registration, the SUPI may be included if the UE does not have a valid 5G-GUTI available; the PEI may be included when the UE has no SUPI and no valid 5G-GUTI. In other cases, the 5G-GUTI may be included and may indicate the last serving AMF. If the UE is already registered via a non-3GPP access in a PLMN different from the new PLMN (e.g., not the registered PLMN or an equivalent PLMN of the registered PLMN) of the 3GPP access, the UE may not provide over the 3GPP access the 5G-GUTI allocated by the AMF during the Registration procedure over the non-3GPP access. Also, if the UE is already registered via a 3GPP access in a PLMN (i.e. the registered PLMN), different from the new PLMN (i.e. not the registered PLMN or an equivalent PLMN of the registered PLMN) of the non-3GPP access, the UE may not provide over the non-3GPP access the 5G-GUTI allocated by the AMF during the Registration procedure over the 3GPP access. The UE may provide the UE's usage setting based on its configuration, e.g., as defined in TS 23.501 [2] clause 5.16.3.7. In case of Initial Registration or Mobility Registration Update, the UE may include the Mapping Of Requested NSSAI, which is the mapping of each S-NSSAI of the Requested NSSAI to the S-NSSAIs of the Configured NSSAI for the HPLMN, to ensure that the network is able to verify whether the S-NSSAI(s) in the Requested NSSAI are permitted based on the Subscribed S-NSSAIs.

If available, the last visited TAI may be included in order to help the AMF produce Registration Area for the UE.

The Security parameters may be used for Authentication and integrity protection, see TS 33.501 [15]. Requested NSSAI indicates the Network Slice Selection Assistance Information (e.g., as defined in clause 5.15 of TS 23.501 [2]). The PDU Session status may indicate the previously established PDU Sessions in the UE. When the UE is connected to the two AMFs belonging to different PLMN via 3GPP access and non-3GPP access then the PDU Session status may indicate the established PDU Session of the current PLMN in the UE. The PDU Session(s) to be re-activated is included to indicate the PDU Session(s) for which the UE intends to activate UP connections. A PDU Session corresponding to a LADN shall not be included in the PDU Session(s) to be re-activated when the UE is outside the area of availability of the LADN. The Follow on request is included when the UE has pending uplink signalling and the UE doesn't include PDU Session(s) to be re-activated, or the Registration type indicates the UE wants to perform an Emergency Registration.

2. If a SUPI is included or the 5G-GUTI does not indicate a valid AMF the (R)AN, based on (R)AT and Requested NSSAI, if available, may select an AMF. The (R)AN may select an AMF as described in TS 23.501 [2], clause 6.3.5. If UE is in CM-CONNECTED state, the (R)AN can forward the Registration Request message to the AMF based on the N2 connection of the UE. If the (R)AN cannot select an appropriate AMF, it may forward the Registration Request to an AMF which has been configured, in (R)AN, to perform AMF selection.

3. (R)AN to new AMF: N2 message (N2 parameters, RM-NAS Registration Request (Registration type, SUPI or 5G-GUTI, last visited TAI (if available), Security parameters, Requested NSSAI, Mapping Of Requested NSSAI, UE 5GC Capability, PDU Session status, PDU Session(s) to be re-activated, Follow on request, and MICO mode preference)). When NG-RAN is used, the N2 parameters may include the Selected PLMN ID, Location Information, Cell Identity and the RAT type related to the cell in which the UE is camping. When NG-RAN is used, the N2 parameters may also include the Establishment cause. If the Registration type indicated by the UE is Periodic Registration Update, then steps 4 to 17 may be omitted.

4. [Conditional] new AMF to old AMF: Namf_Communication_UEContextTransfer (complete Registration Request). If the UE's 5G-GUTI was included in the Registration Request and the serving AMF has changed since last Registration procedure, the new AMF may invoke the Namf_Communication_UEContextTransfer service operation on the old AMF including the complete Registration Request IE, which may be integrity protected, to request the UE's SUPI and MM Context. See clause 5.2.2.2.2 for details of this service operation. The old AMF uses the integrity protected complete Registration request IE to verify if the context transfer service operation invocation corresponds to the UE requested. The old AMF may also transfer the event subscriptions information by each NF consumer, for the UE, to the new AMF. The NF consumers may not need to subscribe for the events once again with the new AMF after the UE is successfully registered with the new AMF. If the new AMF has already received UE contexts from the old AMF during handover procedure, then step 4, 5, and 10 may be skipped.

For an Emergency Registration, if the UE identifies itself with a 5G-GUTI that is not known to the AMF, steps 4 and 5 may be skipped and the AMF may immediately request the SUPI from the UE. If the UE identifies itself with PEI, the SUPI request may be skipped. Allowing Emergency Registration without a user identity is dependent on local regulations.

5. [Conditional] old AMF to new AMF: Response to Namf_Communication_UEContextTransfer (SUPI, MM Context, SMF information, PCF ID). Old AMF may respond to the new AMF for the Namf_Communication_UEContextTransfer invocation by including the UE's SUPI and MM Context. If old AMF holds information about established PDU Sessions, the old AMF may include SMF information including S-NSSAI(s), SMF identities and PDU Session ID. If old AMF holds information about active NGAP UE-TNLA bindings to N3IWF, the old AMF may include information about the NGAP UE-TNLA bindings.

6. [Conditional] new AMF to UE: Identity Request 0. If the SUPI is not provided by the UE nor retrieved from the old AMF, the Identity Request procedure may be initiated by AMF sending an Identity Request message to the UE requesting the SUCI.

7. [Conditional] UE to new AMF: Identity Response ( ). The UE may respond with an Identity Response message including the SUCI. The UE may derive the SUCI by using the provisioned public key of the HPLMN, g., as specified in TS 33.501 [15].

8. The AMF may decide to initiate UE authentication by invoking an AUSF. In that case, the AMF may select an AUSF based on SUPI or SUCI, e.g., as described in TS 23.501 [2], clause 6.3.4. If the AMF is configured to support Emergency Registration for unauthenticated SUPIs and the UE indicated Registration type Emergency Registration, the AMF may skip the authentication and security setup or the AMF may accept that the authentication may fail and continue the Registration procedure.

9a. The AUSF may execute authentication of the UE. In one embodiment, the authentication is performed as described in TS 33.501 [15], by Nudm_UEAuthenticate_Get operation. The AUSF may discover a UDM as described in TS 23.501 [2], clause 6.3.8. In case the AMF provided a SUCI to AUSF, the AUSF may return the SUPI to AMF only after the authentication is successful. If network slicing is used, the AMF may decide if the Registration Request needs to be rerouted, e.g., as described in clause 4.2.2.2.3, where the initial AMF refers to the AMF.

9b The AMF may initiate NAS security functions. The NAS security may be performed as described in TS 33.501 [15].

9c. Upon completion of NAS security function setup, the AMF may initiate NGAP procedure, e.g., as specified in TS 38.413 [10]. This is to enable 5G-AN use it for securing procedures with the UE.

9d. The 5G-AN may store the security context and acknowledge to the AMF. The 5G-AN may use the security context to protect the messages exchanged with the UE, e.g., as described in TS 33.501 [15].

10. [Conditional] new AMF to old AMF: Namf_Communication_RegistrationCompleteNotify ( ). If the AMF has changed, the new AMF may notify the old AMF that the registration of the UE in the new AMF is completed by invoking the Namf_Communication_RegistrationCompleteNotify service operation. If the authentication/security procedure fails, then the Registration may be rejected, and the new AMF may invoke the Namf_Communication_RegistrationCompleteNotify service operation with a reject indication reason code towards the old AMF. The old AMF may continue as if the UE context transfer service operation was never received.

If one or more of the S-NSSAIs used in the old Registration Area cannot be served in the target Registration Area, the new AMF may determine which PDU Session cannot be supported in the new Registration Area. The new AMF may invoke the Namf_Communication_RegistrationCompleteNotify service operation including the rejected PDU Session ID and a reject cause (e.g. the S-NSSAI becomes no longer available) towards the old AMF. Then the new AMF may modify the PDU Session Status correspondingly. The old AMF may inform the corresponding SMF(s) to locally release the UE's SM context by invoking the Nsmf_PDUSession_ReleaseSMContext service operation. See clause 5.2.2.2.3 for details of Namf_Communication_RegistrationCompleteNotify service operation.

11. [Conditional] new AMF to UE: Identity Request/Response (PEI). If the PEI was not provided by the UE nor retrieved from the old AMF, the Identity Request procedure may be initiated by AMF sending an Identity Request message to the UE to retrieve the PEI. The PEI may be transferred encrypted unless the UE performs Emergency Registration and cannot be authenticated. For an Emergency Registration, the UE may have included the PEI in the Registration Request. If so, the PEI retrieval is skipped.

12. Optionally, the new AMF may initiate ME identity check by invoking the N5g-eir_EquipmentIdentityCheck_Get service operation (see clause 5.2.4.2.2). The PEI check may be performed as described in clause 4.7. For an Emergency Registration, if the PEI is blocked, operator policies may determine whether the Emergency Registration procedure continues or is stopped.

13. If step 14 is to be performed, the new AMF, based on the SUPI, may select a UDM, then UDM may select a UDR instance. See TS 23.501 [2], clause 6.3.9. The AMF may select a UDM as described in TS 23.501 [2], clause 6.3.8.

14a-b. If the AMF has changed since the last Registration procedure, or if the UE provides a SUPI which doesn't refer to a valid context in the AMF, or if the UE registers to the same AMF it has already registered to a non-3GPP access (i.e. the UE is registered over a non-3GPP access and initiates this Registration procedure to add a 3GPP access), the new AMF may register with the UDM using Nudm_UECM_Registration and subscribe to be notified when the UDM deregisters this AMF. The UDM may store the AMF identity associated to the Access Type and does not remove the AMF identity associated to the other Access Type. UDM may store information provided at registration in UDR, by Nudr_UDM_Update.

AMF may retrieve the Access and Mobility subscription data and SMF Selection Subscription data using Nudm_SDM_Get. This may require that UDM may retrieve this information from UDR by Nudr_UDM_Query (Access and Mobility Subscription data). After a successful response is received, the AMF may subscribe to be notified using Nudm_SDM_Subscribe when the data requested is modified, UDM may subscribe to UDR by Nudr_UDM_Subscribe. The GPSI may be provided to the AMF in the subscription data from the UDM if the GPSI is available in the UE subscription data.

The new AMF may provide the Access Type it serves for the UE to the UDM and the Access Type is set to "3GPP access". The UDM may store the associated Access Type together with the serving AMF in UDR by Nudr_UDM_Update. The new AMF may create an MM context for the UE after getting the mobility subscription data from the UDM. For an Emergency Registration in which the UE was not successfully authenticated, the AMF may not register with the UDM. For an Emergency Registration, the AMF may not check for access restrictions, regional restrictions or subscription restrictions. For an Emergency Registration, the AMF may ignore any unsuccessful registration response from UDM and continue with the Registration procedure.

14c. When the UDM stores the associated Access Type together with the serving AMF as indicated in step 14a, it may cause the UDM to initiate a Nudm_UECM_DeregistrationNotification (see clause 5.2.3.2.2) to the old AMF corresponding to 3GPP access, if one exists. The old AMF may remove the MM context of the UE. If the serving NF removal reason indicated by the UDM is Initial Registration, then the old AMF may invoke the Namf_EventExposure_Notify service operation towards all the associated SMFs of the UE to notify that the UE is deregistered from old AMF. The SMF may release the PDU Session(s) on getting this notification.

14d. The Old AMF may unsubscribe with the UDM for subscription data using Nudm_SDM_unsubscribe.

15. If the AMF may decide to initiate PCF communication, e.g. the AMF has not yet obtained Access and Mobility policy for the UE or if the Access and Mobility policy in the AMF are no longer valid, the AMF may select a PCF. In case the new AMF receives a PCF ID from the old AMF in step 5 and successfully contacts the PCF identified by the PCF ID, the AMF may select the (V-)PCF identified by the PCF ID. If the PCF identified by the PCF ID cannot be used (e.g. no response from the PCF) or there is no the PCF ID received from the old AMF in step 5, the AMF may select a PCF, e.g., as described in TS 23.501 [2], clause 6.3.7.1.

16. [Optional] new AMF may perform a Policy Association Establishment during Registration procedure, e.g., as defined in clause 4.16.1.2. For an Emergency Registration, this step may be skipped. If the new AMF contacts the PCF identified by the (V-)PCF ID received during inter-AMF mobility in step 5, the new AMF may include the PCF-ID in the Npcf_AMPolicyControl Get operation. This indication may not be included by the AMF during initial registration procedure. If the AMF notifies the Mobility Restrictions (e.g. UE location) to the PCF for adjustment, or if the PCF updates the Mobility Restrictions itself due to some conditions (e.g. application in use, time and date), the PCF may provide the updated Mobility Restrictions to the AMF.

17. The PCF may invoke Namf_EventExposure_Subscribe service operation for UE event subscription.

18. [Conditional] AMF to SMF: Nsmf_PDUSession_UpdateSMContext ( ). For an Emergency Registered UE, this step may be applied when the Registration Type is Mobility Registration Update. The AMF may invoke the Nsmf_PDUSession_UpdateSMContext (see clause 5.2.8.2.6) in the following scenario(s): If the "PDU Session(s) to be re-activated" is included in the Registration Request in step 1, the AMF sends Nsmf_PDUSession_UpdateSMContext Request to SMF(s) associated with the PDU Session(s) to activate User Plane connections of the PDU Session(s). From step 5 onwards described in clause 4.2.3.2 may be executed to complete the User Plane connection activation without sending MM NAS Service Accept from the AMF to (R)AN described in step 12 of clause 4.2.3.2. The SMF may decide to trigger e.g. the intermediate UPF insertion, removal or change of PSA as described in step 5 in clause 4.2.3.2. In the case that the intermediate UPF insertion, removal, or relocation may be performed for the PDU Session(s) not included in "PDU Session(s) to be re-activated", the procedure is performed without N11 and N2 interactions to update the N3 user plane between (R)AN and 5GC.

The AMF may invoke the Nsmf_PDUSession_ReleaseSMContext service operation towards the SMF in the following scenario: If any PDU Session status indicates that it is released at the UE, the AMF may invoke the Nsmf_PDUSession_ReleaseSMContext service operation towards the SMF in order to release any network resources related to the PDU Session.

If the Registration type indicated by the UE is Periodic Registration Update, then steps 20 may be omitted. If the serving AMF is changed, the new AMF may wait until step 17 is finished with all the SMFs associated with the UE. Otherwise, steps 18 to 22 can continue in parallel to this step. The mobility related event notifications towards the NF consumers may be triggered at the end of this procedure for cases, e.g., as described in clause 4.15.4.

19. New AMF to N3IWF: N2 AMF Mobility Request ( ). If the AMF has changed, the new AMF may create an NGAP UE association towards the N3IWF to which the UE is connected.

20. N3IWF to new AMF: N2 AMF Mobility Response ( ).

21. New AMF to UE: Registration Accept (5G-GUTI, accepted 5G-GUTI expiration time, Registration Area, Mobility restrictions, PDU Session status, Allowed NSSAI, [Mapping Of Allowed NSSAI], Periodic Registration Update timer, LADN Information and accepted MICO mode, IMS Voice over PS session supported Indication, Emergency Service Support indicator).

The AMF may send a Registration Accept message to the UE indicating that the Registration Request has been accepted. 5G-GUTI may be included if the AMF allocates a new 5G-GUTI. If 5G-GUTI expiration time is included in step 1, the accepted 5G-GUTI expiration time may indicate when the 5G-GUTI expires, as accepted by the AMF. If the AMF allocates a new Registration area, it may send the Registration area to the UE via Registration Accept message. If there is no Registration area included in the Registration Accept message, the UE may consider the old Registration Area as valid. Mobility Restrictions may be included in case mobility restrictions apply for the UE and Registration Type is not Emergency Registration. The AMF may indicate the established PDU Sessions to the UE in the PDU Session status. The UE may remove locally any internal resources related to PDU Sessions that are not marked as established in the received PDU Session status. When the UE is connected to the two AMFs belonging to different PLMN via 3GPP access and non-3GPP access then the UE may remove locally any internal resources related to the PDU Session of the current PLMN that are not marked as established in received PDU Session status. If the PDU Session status information was in the Registration Request, the AMF may indicate the PDU Session status to the UE. The Mapping Of Allowed NSSAI is the mapping of each S-NSSAI of the Allowed NSSAI to the S-NSSAIs of the Configured NSSAI for the HPLMN. The AMF may include in the Registration Accept message the LADN Information for LADNs, defined in TS 23.501 [2] clause 5.6.5, that are available within the Registration area determined by the AMF for the UE. If the UE included MICO mode in the request, then AMF may respond whether MICO mode should be used. The AMF may set the IMS Voice over PS session supported Indication as described in clause 5.16.3.2 of TS 23.501 [2]. In order to set the IMS Voice over PS session supported Indication the AMF may need to perform the UE/RAN Radio information and Compatibility Request procedure in clause 4.2.8 to check the compatibility of the UE and RAN radio capabilities related to IMS Voice over PS. If the AMF hasn't received Voice Support Match Indicator from the NG-RAN on time then, based on implementation, AMF may set IMS Voice over PS session supported Indication and update it at a later stage. The Emergency Service Support indicator informs the UE that emergency services are supported, i.e. the UE is allowed to request PDU Session for emergency services. The Handover Restriction List and UE-AMBR may be provided to NG-RAN by AMF in this step. For an Emergency Registered UE, no AS security context information may be included in the N2 control messages and there is no NAS level security when the UE cannot be authenticated.

22. [Conditional] UE to new AMF: Registration Complete ( ). The UE may send a Registration Complete message to the AMF to acknowledge if a new 5G-GUTI was assigned. When the "PDU Session(s) to be re-activated" is not included in the Registration Request, the AMF may release the signalling connection with UE, e.g., according to clause 4.2.6. When the Follow on request is included in the Registration Request, the AMF may not release the signalling connection after the completion of the Registration procedure. If the AMF is aware that some signalling is pending in the AMF or between the UE and the 5GC, the AMF may not release the signalling connection immediately after the completion of the Registration procedure.

Figure 11:
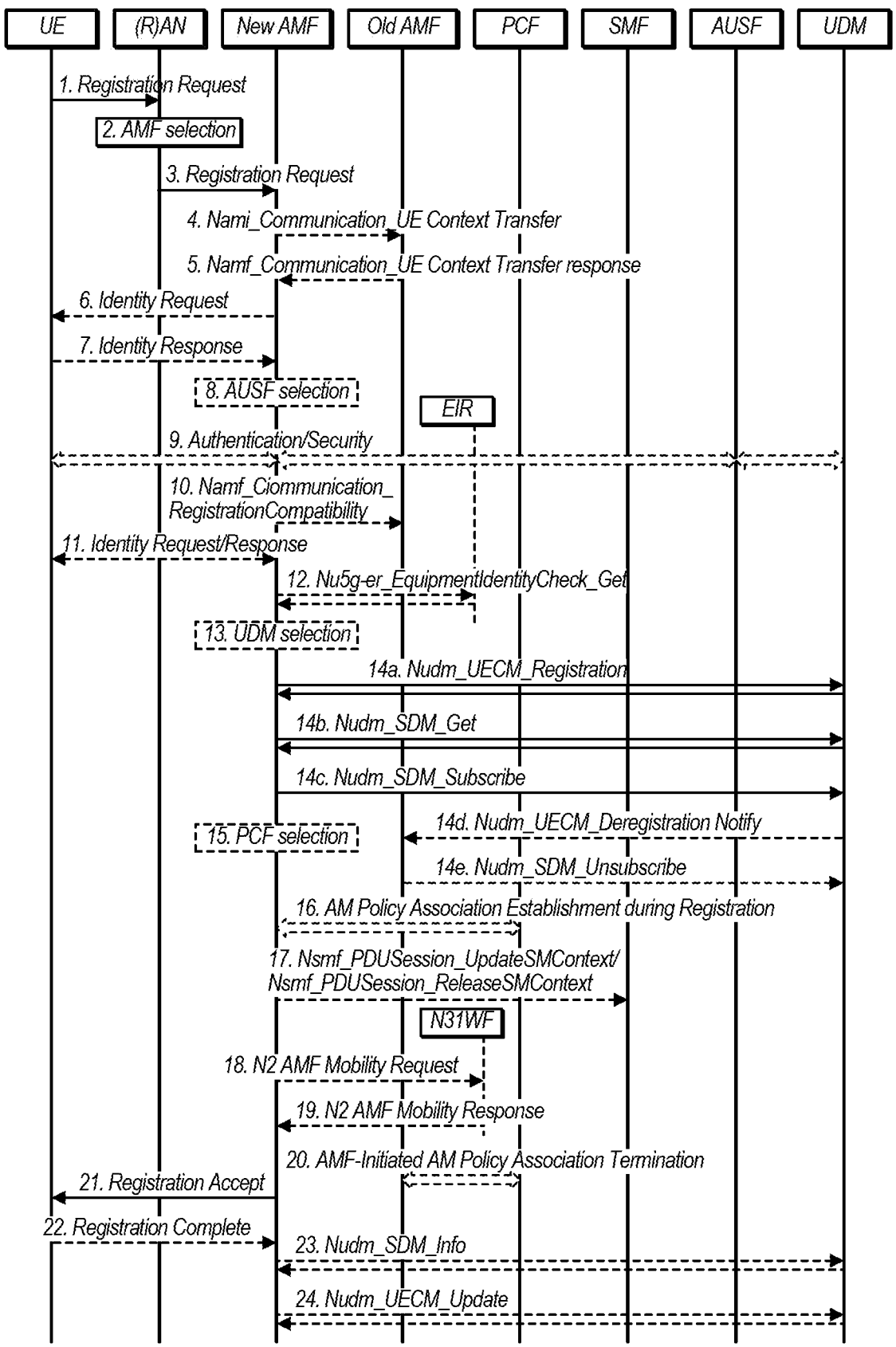

FIG. 11 illustrates a modified version of the exemplary registration procedure of FIG. 10.

At 1: UE to (R)AN: AN message (AN parameters, Registration Request (Registration type, SUCI or 5G-GUTI or PEI, last visited TAI (if available), Security parameters, Requested NSSAI, [Mapping Of Requested NSSAI], Default Configured NSSAI Indication, UE Radio Capability Update, UE MM Core Network Capability, PDU Session status, List Of PDU Sessions To Be Activated, Follow-on request, MICO mode preference, Requested DRX parameters, [LADN DNN(s) or Indicator Of Requesting LADN Information]) and UE Policy Container (the list of PSIs, indication of UE support for ANDSP)).

In the case of NG-RAN, the AN parameters may include e.g. SUCI or the 5G-GUTI, the Selected PLMN ID and Requested NSSAI, the AN parameters may also include Establishment cause. The Establishment cause may provide the reason for requesting the establishment of an RRC connection.

The Registration type may indicate if the UE wants to perform an Initial Registration (i.e. the UE is in RM-DEREGISTERED state), a Mobility Registration Update (i.e. the UE is in RM-REGISTERED state and initiates a Registration procedure due to mobility or due to the UE need to update its capabilities or protocol parameters, or to request a change of the set of network slices it is allowed to use), a Periodic Registration Update (i.e. the UE is in RM-REGISTERED state and initiates a Registration procedure due to the Periodic Registration Update timer expiry.

When the UE is performing an Initial Registration the UE may indicate its UE identity in the Registration Request message as follows, listed in decreasing order of preference: a native 5G-GUTI assigned by the PLMN to which the UE is attempting to register, if available; a native 5G-GUTI assigned by an equivalent PLMN to the PLMN to which the UE is attempting to register, if available; a native 5G-GUTI assigned by any other PLMN, if available. NOTE 1: This can also be a 5G-GUTIs assigned via another access type. Otherwise, the UE may include its SUCI in the Registration Request as defined in TS 33.501 [15].

When the UE is performing an Initial Registration (i.e., the UE is in RM-DEREGISTERED state) with a native 5G-GUTI then the UE may indicate the related GUAMI information in the AN parameters. When the UE is performing an Initial Registration with its SUCI, the UE may not indicate any GUAMI information in the AN parameters.

If the UE previously received a UE Configuration Update Command indicating that the UE needs to re-register and that it shall not provide the 5G-GUTI in access stratum signalling when performing the Registration procedure, the UE may perform a Mobility Registration and shall not include any GUAMI information in the AN parameters. For an Emergency Registration, the SUCI may be included if the UE does not have a valid 5G-GUTI available; the PEI may be included when the UE has no SUPI and no valid 5G-GUTI. In other cases, the 5G-GUTI may be included and it may indicate the last serving AMF.

The UE may provide the UE's usage setting based on its configuration as defined in TS 23.501 [2] clause 5.16.3.7. In case of Initial Registration or Mobility Registration Update, the UE may include the Mapping Of Requested NSSAI (if available), which is the mapping of each S-NSSAI of the Requested NSSAI to the HPLMN S-NSSAIs, to ensure that the network is able to verify whether the S-NSSAI(s) in the Requested NSSAI are permitted based on the Subscribed S-NSSAIs. The UE may include the Default Configured NSSAI Indication if the UE is using a Default Configured NSSAI, as defined in TS 23.501 [2].

In the case of Mobility Registration Update, the UE may include in the List Of PDU Sessions To Be Activated the PDU Sessions for which there are pending uplink data. When the UE includes the List Of PDU Sessions To Be Activated, the UE may indicate PDU Sessions only associated with the access the Registration Request is related to. In some cases (see TS 24.501 [25]) the UE may include PDU Sessions in the List Of PDU Sessions To Be Activated even if there are no pending uplink data for those PDU Sessions.

NOTE 2: A PDU Session corresponding to a LADN may not be included in the List Of PDU Sessions To Be Activated when the UE is outside the area of availability of the LADN. The UE MM Core Network Capability may be provided by the UE and may be handled by AMF as defined in TS 23.501 [2] clause 5.4.4a The UE may include in the UE MINI Core Network Capability an indication if it supports Request Type flag "handover" for PDN connectivity request during the attach procedure as defined in clause 5.17.2.3.1 of TS 23.501 [2]. The UE may provide either the LADN DNN(s) or an Indication Of Requesting LADN Information as described in TS 23.501 [2] clause 5.6.5. If available, the last visited TAI may be included in order to help the AMF produce Registration Area for the UE.

The Security parameters may be used for Authentication and integrity protection, see TS 33.501 [15]. Requested NSSAI indicates the Network Slice Selection Assistance Information (as defined in clause 5.15 of TS 23.501 [2]). The PDU Session status may indicate the previously established PDU Sessions in the UE. When the UE is connected to the two AMFs belonging to different PLMN via 3GPP access and non-3GPP access then the PDU Session status may indicate the established PDU Session of the current PLMN in the UE.

The Follow-on request is included when the UE has pending uplink signalling and the UE doesn't include List Of PDU Sessions To Be Activated, or the Registration type may indicate the UE wants to perform an Emergency Registration. In Initial Registration and Mobility Registration Update, UE may provide the UE Requested DRX parameters, as defined in clause 5.4.5 of TS 23.501 [2]. The UE may provide UE Radio Capability Update indication as described in TS 23.501 [2].

The UE access selection and PDU session selection may identify the list of UE access selection and PDU session selection policy information stored in the UE, defined in clause 6.6 of TS 23.503 [20]. They may be used by the PCF to determine if the UE has to be updated with new PSIs or if some of the stored ones are no longer applicable and have to be removed.

2. If a 5G-GUTI is not included or the 5G-GUTI does not indicate a valid AMF the (R)AN, based on (R)AT and Requested NSSAI, if available, may select an AMF. The (R)AN may select an AMF as described in TS 23.501 [2], clause 6.3.5. If UE is in CM-CONNECTED state, the (R)AN can forward the Registration Request message to the AMF based on the N2 connection of the UE. If the (R)AN cannot select an appropriate AMF, it may forward the Registration Request to an AMF which has been configured, in (R)AN, to perform AMF selection.

3. (R)AN to new AMF: N2 message (N2 parameters, Registration Request (as described in step 1) and UE Policy Container. When NG-RAN is used, the N2 parameters may include the Selected PLMN ID, Location Information and Cell Identity related to the cell in which the UE is camping, UE Context Request which may indicate that a UE context including security information needs to be setup at the NG-RAN. When NG-RAN is used, the N2 parameters may also include the Establishment cause. Mapping Of Requested NSSAI may be provided only if available.

If the Registration type indicated by the UE is Periodic Registration Update, then steps 4 to 20 may be omitted.

4. [Conditional] new AMF to old AMF: Namf_Communication_UEContextTransfer (complete Registration Request) or new AMF to UDSF: Nudsf_Unstructured Data Management_Query( ).

(With UDSF Deployment): If the UE's 5G-GUTI was included in the Registration Request and the serving AMF has changed since last Registration procedure, new AMF and old AMF are in the same AMF Set and UDSF is deployed, the new AMF may retrieve the stored UE's SUPI and UE context directly from the UDSF using Nudsf_UnstructuredDataManagement_Query service operation or they can share stored UE context via implementation specific means if UDSF is not deployed. This may include also event subscription information by each NF consumer for the given UE. In this case, the new AMF uses integrity protected complete Registration request NAS message to perform and verify integrity protection.

(Without UDSF Deployment): If the UE's 5G-GUTI was included in the Registration Request and the serving AMF has changed since last Registration procedure, the new AMF may invoke the Namf_Communication_UEContextTransfer service operation on the old AMF including the complete Registration Request NAS message, which may be integrity protected, to request the UE's SUPI and UE Context. See clause 5.2.2.2.2 for details of this service operation. In this case, the old AMF may use either 5G-GUTI and the integrity protected complete Registration request NAS message, or the SUPI and an indication that the UE is validated from the new AMF, to verify integrity protection if the context transfer service operation invocation corresponds to the UE requested. The old AMF may also transfer the event subscriptions information by each NF consumer, for the UE, to the new AMF.

NOTE 3: The new AMF may set the indication that the UE is validated according to step 9a, in case the new AMF has performed successful UE authentication after previous integrity check failure in the old AMF. NOTE 4: The NF consumers may not need to subscribe for the events once again with the new AMF after the UE is successfully registered with the new AMF. If the new AMF has already received UE contexts from the old AMF during handover procedure, then step 4, 5 and 10 may be skipped.

For an Emergency Registration, if the UE identifies itself with a 5G-GUTI that is not known to the AMF, steps 4 and 5 may be skipped and the AMF may immediately request the SUPI from the UE. If the UE identifies itself with PEI, the SUPI request may be skipped. Allowing Emergency Registration without a user identity is dependent on local regulations.

5. [Conditional] old AMF to new AMF: Response to Namf_Communication_UEContextTransfer (SUPI, UE Context in AMF (as per Table 5.2.2.2.2-1)) or UDSF to new AMF: Nudsf_Unstructured Data Management_Query( ). The old AMF may start an implementation specific (guard) timer for the UE context.

If the UDSF was queried in step 4, the UDSF may respond to the new AMF for the Nudsf_Unstructured Data Management_Query invocation with the related contexts including established PDU Sessions, the old AMF may include SMF information DNN, S-NSSAI(s) and PDU Session ID, active NGAP UE-TNLA bindings to N3IWF, the old AMF includes information about the NGAP UE-TNLA bindings. If the Old AMF was queried in step 4, Old AMF may respond to the new AMF for the Namf_Communication_UEContextTransfer invocation by including the UE's SUPI and UE Context.

If old AMF holds information about established PDU Session(s), the old AMF may include SMF information, DNN(s), S-NSSAI(s) and PDU Session ID(s). If old AMF holds information about active NGAP UE-TNLA bindings to N3IWF, the old AMF may include information about the NGAP UE-TNLA bindings. If old AMF fails the integrity check of the Registration Request NAS message, the old AMF may indicate the integrity check failure. If old AMF holds information about AM Policy Association, the old AMF may include the information about the AM Policy Association including the policy control request trigger and PCF ID. In the roaming case, V-PCF ID and H-PCF ID may be included.

NOTE 5: When new AMF uses UDSF for context retrieval, interactions between old AMF, new AMF and UDSF due to UE signaling on old AMF at the same time is implementation issue.

6. [Conditional] new AMF to UE: Identity Request ( ). If the SUCI is not provided by the UE nor retrieved from the old AMF the Identity Request procedure may be initiated by AMF sending an Identity Request message to the UE requesting the SUCI.

7. [Conditional] UE to new AMF: Identity Response ( ). The UE may respond with an Identity Response message including the SUCI. The UE derives the SUCI by using the provisioned public key of the HPLMN, as specified in TS 33.501 [15].

8. The AMF may decide to initiate UE authentication by invoking an AUSF. In that case, the AMF selects an AUSF based on SUPI or SUCI, as described in TS 23.501 [2], clause 6.3.4. If the AMF is configured to support Emergency Registration for unauthenticated SUPIs and the UE indicated Registration type Emergency Registration, the AMF may skip the authentication or the AMF may accept that the authentication may fail and continues the Registration procedure.

9a. If authentication is required, the AMF may request it from the AUSF; if Tracing Requirements about the UE are available at the AMF, the AMF may provide Tracing Requirements in its request to AUSF. Upon request from the AMF, the AUSF shall execute authentication of the UE. The authentication may be performed as described in TS 33.501 [15]. The AUSF selects a UDM as described in TS 23.501 [2], clause 6.3.8 and gets the authentication data from UDM.

Once the UE has been authenticated the AUSF may provide relevant security related information to the AMF. In case the AMF provided a SUCI to AUSF, the AUSF may return the SUPI to AMF only after the authentication is successful. After successful authentication in new AMF, which is triggered by the integrity check failure in old AMF at step 5, the new AMF may invoke step 4 above again and indicates that the UE is validated (i.e. through the reason parameter as specified in clause 5.2.2.2.2). The AMF may decide if the Registration Request needs to be rerouted as described in clause 4.2.2.2.3, where the initial AMF refers to the AMF.

9b If NAS security context does not exist, the NAS security initiation may be performed as described in TS 33.501 [15].

9c. The AMF may initiate NGAP procedure to provide the 5G-AN with security context as specified in TS 38.413 [10] if the 5G-AN had requested for UE Context. In addition, if Tracing Requirements about the UE are available at the AMF, the AMF may provide the 5G-AN with Tracing Requirements in the NGAP procedure.

9d. The 5G-AN may store the security context and acknowledge to the AMF. The 5G-AN may use the security context to protect the messages exchanged with the UE as described in TS 33.501 [15].

10. [Conditional] new AMF to old AMF: Namf_Communication_RegistrationCompleteNotify ( ). If the AMF has changed the new AMF may notify the old AMF that the registration of the UE in the new AMF is completed by invoking the Namf_Communication_RegistrationCompleteNotify service operation.

If the authentication/security procedure fails, then the Registration may be rejected, and the new AMF may invoke the Namf_Communication_RegistrationCompleteNotify service operation with a reject indication reason code towards the old AMF. The old AMF may continue as if the UE context transfer service operation was never received.

If one or more of the S-NSSAIs used in the old Registration Area cannot be served in the target Registration Area, the new AMF may determine which PDU Session cannot be supported in the new Registration Area. The new AMF may invoke the Namf_Communication_RegistrationCompleteNotify service operation including the rejected PDU Session ID and a reject cause (e.g. the S-NSSAI becomes no longer available) towards the old AMF. Then the new AMF may modify the PDU Session Status correspondingly. The old AMF may inform the corresponding SMF(s) to locally release the UE's SM context by invoking the Nsmf_PDUSession_ReleaseSMContext service operation. See clause 5.2.2.2.3 for details of Namf_Communication_RegistrationCompleteNotify service operation.

If new AMF received in the UE context transfer in step 2 the information about the AM Policy Association including the PCF ID(s) and decides, based on local policies, not to use the PCF(s) identified by the PCF ID(s) for the AM Policy Association, then it may inform the old AMF that the AM Policy Association in the UE context is not used any longer and then the PCF selection is performed in step 15. The old AMF may terminate the AM Policy Association to the (V-)PCF identified by the PCF ID in step 20.

11. [Conditional] new AMF to UE: Identity Request/Response (PEI). If the PEI was not provided by the UE nor retrieved from the old AMF the Identity Request procedure may be initiated by AMF sending an Identity Request message to the UE to retrieve the PEI. The PEI may be transferred encrypted unless the UE performs Emergency Registration and cannot be authenticated. For an Emergency Registration, the UE may have included the PEI in the Registration Request. If so, the PEI retrieval may be skipped.

12. Optionally the new AMF initiates ME identity check by invoking the N5g-eir_EquipmentIdentityCheck_Get service operation (see clause 5.2.4.2.2). The PEI check may be performed as described in clause 4.7. For an Emergency Registration, if the PEI is blocked, operator policies may determine whether the Emergency Registration procedure continues or is stopped.

13. If step 14 is to be performed, the new AMF, based on the SUPI, may select a UDM, then UDM may select a UDR instance. See TS 23.501 [2], clause 6.3.9. The AMF may select a UDM as described in TS 23.501 [2], clause 6.3.8.

14a-c. If the AMF has changed since the last Registration procedure, or if the UE provides a SUPI which doesn't refer to a valid context in the AMF, or if the UE registers to the same AMF it has already registered to a non-3GPP access (i.e. the UE is registered over a non-3GPP access and initiates this Registration procedure to add a 3GPP access), the new AMF may register with the UDM using Nudm_UECM_Registration and may subscribe to be notified when the UDM deregisters this AMF. The UDM may store the AMF identity associated to the Access Type and may not remove the AMF identity associated to the other Access Type. The UDM may store information provided at registration in UDR, by Nudr_DM_Update.

The AMF may provide the "Homogenous Support of IMS Voice over PS Sessions" indication (see clause 5.16.3.3 of TS 23.501 [2]) to the UDM. The "Homogenous Support of IMS Voice over PS Sessions" indication shall not be included unless the AMF has completed its evaluation of the support of "IMS Voice over PS Session" as specified in clause 5.16.3.2 of TS 23.501 [2].

NOTE 6: At this step, the AMF may not have all the information needed to determine the setting of the IMS Voice over PS Session Supported indication for this UE (see clause 5.16.3.2 of TS 23.501 [2]). Hence the AMF can send the "Homogenous Support of IMS Voice over PS Sessions" later on in this procedure.

The AMF may retrieve the Access and Mobility Subscription data, SMF Selection Subscription data and UE context in SMF data using Nudm_SDM_Get. This may require that UDM may retrieve this information from UDR by Nudr_DM_Query. After a successful response is received, the AMF may subscribe to be notified using Nudm_SDM_Subscribe when the data requested is modified, UDM may subscribe to UDR by Nudr_DM_Subscribe. The GPSI may be provided to the AMF in the Access and Mobility Subscription data from the UDM if the GPSI is available in the UE subscription data. The UDM may provide indication that the subscription data for network slicing is updated for the UE. If the UE is subscribed to MPS in the serving PLMN, "MPS priority" may be included in the Access and Mobility Subscription data provided to the AMF.

The new AMF may provide the Access Type it serves for the UE to the UDM and the Access Type is set to "3GPP access". The UDM may store the associated Access Type together with the serving AMF in UDR by Nudr_DM_Update. The new AMF may create an UE context for the UE after getting the Access and Mobility Subscription data from the UDM. For an Emergency Registration in which the UE was not successfully authenticated, the AMF may not register with the UDM. For an Emergency Registration, the AMF may not check for access restrictions, regional restrictions or subscription restrictions. For an Emergency Registration, the AMF may ignore any unsuccessful registration response from UDM and continue with the Registration procedure.

14d. When the UDM stores the associated Access Type (e.g. 3GPP) together with the serving AMF as indicated in step 14a, it may cause the UDM to initiate a Nudm_UECM_DeregistrationNotification (see clause 5.2.3.2.2) to the old AMF corresponding to the same (e.g. 3GPP) access, if one exists. If the timer started in step 5 is not running, the old AMF may remove the UE context. Otherwise, the AMF may remove UE context when the timer expires. If the serving NF removal reason indicated by the UDM is Initial Registration, then, as described in clause 4.2.2.3.2, the old AMF may invoke the Nsmf_PDUSession_ReleaseSMContext (SUPI, PDU Session ID) service operation towards all the associated SMF(s) of the UE to notify that the UE is deregistered from old AMF. The SMF(s) may release the PDU Session on getting this notification.

If the old AMF has an N2 connection for that UE (e.g. because the UE was in RRC Inactive state but has now moved to E-UTRAN or moved to an area not served by the old AMF), the old AMF may perform AN Release (see clause 4.2.6) with a cause value that indicates that the UE has already locally released the NG-RAN's RRC Connection.

14e. The Old AMF may unsubscribe with the UDM for subscription data using Nudm_SDM_unsubscribe.

15. If the AMF decides to initiate PCF communication, the AMF may act as follows. If the new AMF decided to contact the (V-)PCF identified by PCF ID included in UE context from the old AMF in step 5, the AMF may contact the (V-)PCF identified by the (V-)PCF ID. If the AMF decides to perform PCF discovery and selection and the AMF selects a (V)-PCF and may select an H-PCF (for roaming scenario) as described in TS 23.501 [2], clause 6.3.7.1 and according to the V-NRF to H-NRF interaction described in clause 4.3.2.2.3.3.

16. [Optional] new AMF may perform an AM Policy Association Establishment as defined in clause 4.16.1.2. For an Emergency Registration, this step may be skipped.

If the new AMF contacts the PCF identified by the (V-)PCF ID received during inter-AMF mobility in step 5, the new AMF may include the PCF ID(s) in the Npcf_AMPolicyControl Create operation. This indication may not be included by the AMF during initial registration procedure. If the AMF notifies the Mobility Restrictions (e.g. UE location) to the PCF for adjustment, or if the PCF updates the Mobility Restrictions itself due to some conditions (e.g. application in use, time and date), the PCF may provide the updated Mobility Restrictions to the AMF. If the subscription information includes Tracing Requirements, the AMF may provide the PCF with Tracing Requirements.

17. [Conditional] AMF to SMF: Nsmf_PDUSession_UpdateSMContext ( ). For an Emergency Registered UE (see TS 23.501 [2]), this step may be applied when the Registration Type is Mobility Registration Update.

The AMF may invoke the Nsmf_PDUSession_UpdateSMContext (see clause 5.2.8.2.6) in the following scenario(s):

If the List Of PDU Sessions To Be Activated is included in the Registration Request in step 1, the AMF may send Nsmf_PDUSession_UpdateSMContext Request to SMF(s) associated with the PDU Session(s) in order to activate User Plane connections of these PDU Session(s). Steps from step 5 onwards described in clause 4.2.3.2 may be executed to complete the User Plane connection activation without sending MM NAS Service Accept from the AMF to (R)AN described in step 12 of clause 4.2.3.2.

When the serving AMF has changed, the new serving AMF may notify the SMF for each PDU Session that it has taken over the responsibility of the signalling path towards the UE: the new serving AMF may invoke the Nsmf_PDUSession_UpdateSMContext service operation using SMF information received from the old AMF at step 5. It may also indicate whether the PDU Session is to be re-activated. In the case of PLMN change from V-PLMN to H-PLMN, the new serving AMF may only invoke the Nsmf_PDUSession_UpdateSMContext service operation for Home Routed PDU session(s).

NOTE 7: If the UE moves into a V-PLMN, the AMF in the V-PLMN may not insert or change the V-SMF(s) even for Home Routed PDU session(s).

Steps from step 5 onwards described in clause 4.2.3.2 may be executed. In the case that the intermediate UPF insertion, removal, or change is performed for the PDU Session(s) not included in "PDU Session(s) to be re-activated", the procedure may be performed without N11 and N2 interactions to update the N3 user plane between (R)AN and 5GC.

The AMF may invoke the Nsmf_PDUSession_ReleaseSMContext service operation towards the SMF in the following scenario: If any PDU Session status indicates that it is released at the UE, the AMF may invoke the Nsmf_PDUSession_ReleaseSMContext service operation towards the SMF in order to release any network resources related to the PDU Session. If the serving AMF is changed, the new AMF may wait until step 18 is finished with all the SMFs associated with the UE. Otherwise, steps 19 to 22 may continue in parallel to this step.

18. New AMF to N3IWF: N2 AMF Mobility Request ( ). If the AMF has changed and the old AMF has indicated an existing NGAP UE association towards a N3IWF, the new AMF may create an NGAP UE association towards the N3IWF to which the UE is connected. This may automatically releases the existing NGAP UE association between the old AMF and the N3IWF 19. N3IWF to new AMF: N2 AMF Mobility Response ( ).

20. [Conditional] old AMF to (V-)PCF: AMF-Initiated Policy Association Termination. If the old AMF previously initiated a Policy Association to the PCF, and the old AMF did not transfer the PCF ID(s) to the new AMF (e.g. new AMF is in different PLMN), the old AMF may perform an AMF-initiated Policy Association Termination procedure, as defined in clause 4.16.3.2, to delete the association with the PCF. In addition, if the old AMF transferred the PCF ID(s) in the UE context but the new AMF informed in step 10 that the AM Policy Association information in the UE context may not be used then the old AMF performs an AMF-initiated Policy Association Termination procedure, as defined in clause 4.16.3.2, to delete the association with the PCF.

21. New AMF to UE: Registration Accept (5G-GUTI, Registration Area, Mobility restrictions, PDU Session status, Allowed NSSAI, [Mapping Of Allowed NSSAI], [Configured NSSAI for the Serving PLMN], [Mapping Of Configured NSSAI], Periodic Registration Update timer, LADN Information and accepted MICO mode, IMS Voice over PS session supported Indication, Emergency Service Support indicator, Accepted DRX parameters, Network support of Interworking without N26, Network Slicing Subscription Change Indication). The Allowed NSSAI for the Access Type for the UE may be included in the N2 message carrying the Registration Accept message.

The AMF may send a Registration Accept message to the UE indicating that the Registration Request has been accepted. 5G-GUTI is included if the AMF allocates a new 5G-GUTI. If the UE is already in RM-REGISTERED state via another access in the same PLMN, the UE shall use the 5G-GUTI received in the Registration Accept for both registrations. If no 5G-GUTI is included in the Registration Accept, then the UE may use the 5G-GUTI assigned for the existing registration also for the new registration. If the AMF allocates a new Registration area, it may send the Registration area to the UE via Registration Accept message. If there is no Registration area included in the Registration Accept message, the UE may consider the old Registration Area as valid. Mobility Restrictions may be included in case mobility restrictions applies for the UE and Registration Type is not Emergency Registration. The AMF may indicate the established PDU Sessions to the UE in the PDU Session status. The UE may remove locally any internal resources related to PDU Sessions that are not marked as established in the received PDU Session status. If the AMF invokes the Nsmf_PDUSession_UpdateSMContext procedure for UP activation of PDU Session(s) in step 18 and receives rejection from the SMF, then the AMF may indicate to the UE the PDU Session ID and the cause why the User Plane resources were not activated. When the UE is connected to the two AMFs belonging to different PLMN via 3GPP access and non-3GPP access then the UE may remove locally any internal resources related to the PDU Session of the current PLMN that are not marked as established in received PDU Session status. If the PDU Session status information was in the Registration Request, the AMF may indicate the PDU Session status to the UE. The Mapping Of Allowed NSSAI is the mapping of each S-NSSAI of the Allowed NSSAI to the HPLMN S-NSSAIs. The Mapping Of Configured NSSAI may be the mapping of each S-NSSAI of the Configured NSSAI for the Serving PLMN to the HPLMN S-NSSAIs. The AMF may include in the Registration Accept message the LADN Information for the list of LADNs, described in TS 23.501 [2] clause 5.6.5, that are available within the Registration area determined by the AMF for the UE. If the UE included MICO mode in the request, then AMF may respond whether MICO mode should be used.

In the case of registration over 3GPP access, the AMF may set the IMS Voice over PS session supported Indication as described in clause 5.16.3.2 of TS 23.501 [2]. In order to set the IMS Voice over PS session supported Indication the AMF may need to perform the UE Capability Match Request procedure in clause 4.2.8a to check the compatibility of the UE and NG-RAN radio capabilities related to IMS Voice over PS. If the AMF hasn't received Voice Support Match Indicator from the NG-RAN on time then, based on implementation, AMF may set IMS Voice over PS session supported Indication and update it at a later stage. In the case of registration over non-3GPP access, the AMF may set the IMS Voice over PS session supported Indication as described in clause 5.16.3.2a of TS 23.501 [2].

The Emergency Service Support indicator informs the UE that emergency services are supported, i.e. the UE is allowed to request PDU Session for emergency services. If the AMF received "MPS priority" from the UDM as part of Access and Mobility Subscription data, based on operator policy, "MPS priority" may be included in the Registration Accept message to the UE to inform the UE whether configuration of Access Identity 1 is valid within the selected PLMN, as specified in TS 24.501 [25]. The Accepted DRX parameters are defined in clause 5.4.5 of TS 23.501 [2]. The AMF may set the Interworking without N26 parameter as described in clause 5.17.2.3.1 of TS 23.501 [2].

RRC Inactive Assistance Information might be provided to NG-RAN (see TS 23.501 [2] clause 5.3.3.2.5) in this step.

If the UDM intends to indicate the UE that subscription has changed, the Network Slicing Subscription Change Indication may be included. If the AMF includes Network Slicing Subscription Change Indication, then the UE may locally erase all the network slicing configuration for all PLMNs and, if applicable, update the configuration for the current PLMN based on any received information.

22. [Conditional] UE to new AMF: Registration Complete ( ). The UE may send a Registration Complete message to the AMF when it has successfully updated itself after receiving any of the [Configured NSSAI for the Serving PLMN], [Mapping Of Configured NSSAI] and a Network Slicing Subscription Change Indication in step 21. The UE may send a Registration Complete message to the AMF to acknowledge if a new 5G-GUTI was assigned. When the List Of PDU Sessions To Be Activated is not included in the Registration Request, the AMF may release the signalling connection with UE, according to clause 4.2.6. When the Follow-on request is included in the Registration Request, the AMF may not release the signalling connection after the completion of the Registration procedure. If the AMF is aware that some signalling is pending in the AMF or between the UE and the 5GC, the AMF may not release the signalling connection immediately after the completion of the Registration procedure.

23. [Conditional] AMF to UDM: If the Access and Mobility Subscription data provided by UDM to AMF in 14b includes Steering of Roaming information with an indication that the UDM may request an acknowledgement of the reception of this information from the UE, the AMF provides the UE acknowledgement to UDM using Nudm_SDM_Info. For more details regarding the handling of Steering of Roaming information refer to TS 23.122 [22].

The AMF also may use the Nudm_SDM_Info service operation to provide an acknowledgment to UDM that the UE received the Network Slicing Subscription Change Indication (see step 21 and step 22) and acted upon it.

24. [Conditional] AMF to UDM: After step 14a, and in parallel to any of the preceding steps, the AMF may send a "Homogeneous Support of IMS Voice over PS Sessions" indication to the UDM using Nudm_UECM_Update: If the AMF has evaluated the support of IMS Voice over PS Sessions, see clause 5.16.3.2 of TS 23.501 [2], and If the AMF determines that it needs to update the Homogeneous Support of IMS Voice over PS Sessions, see clause 5.16.3.3 of TS 23.501 [2].

In some embodiments, a UE configuration update procedure for access and mobility management related parameters may be initiated by the AMF when the AMF wants to update access and mobility management related parameters in the UE configuration. The procedure may apply only to information in the UE that does not require negotiation between the UE and the network.

This procedure may also be used to trigger UE to perform, based on network indication, either Registration Update procedure while the UE is in CM-CONNECTED state to modify parameters that require negotiation (e.g. MICO mode) or Registration Update procedure after the UE enters CM-IDLE state (e.g. for changes to Allowed NSSAI that require re-registration).

If the AMF wants to update NAS parameters in the UE which require UE acknowledgement, then the AMF may provide an indication to the UE of whether the UE shall acknowledge the command or not. The AMF may not request acknowledgement of the NITZ command. The AMF may request acknowledgement for NSSAI information (e.g. Allowed NSSAI), 5G-GUTI, TAI List, and Mobility Restrictions.

Figure 12:
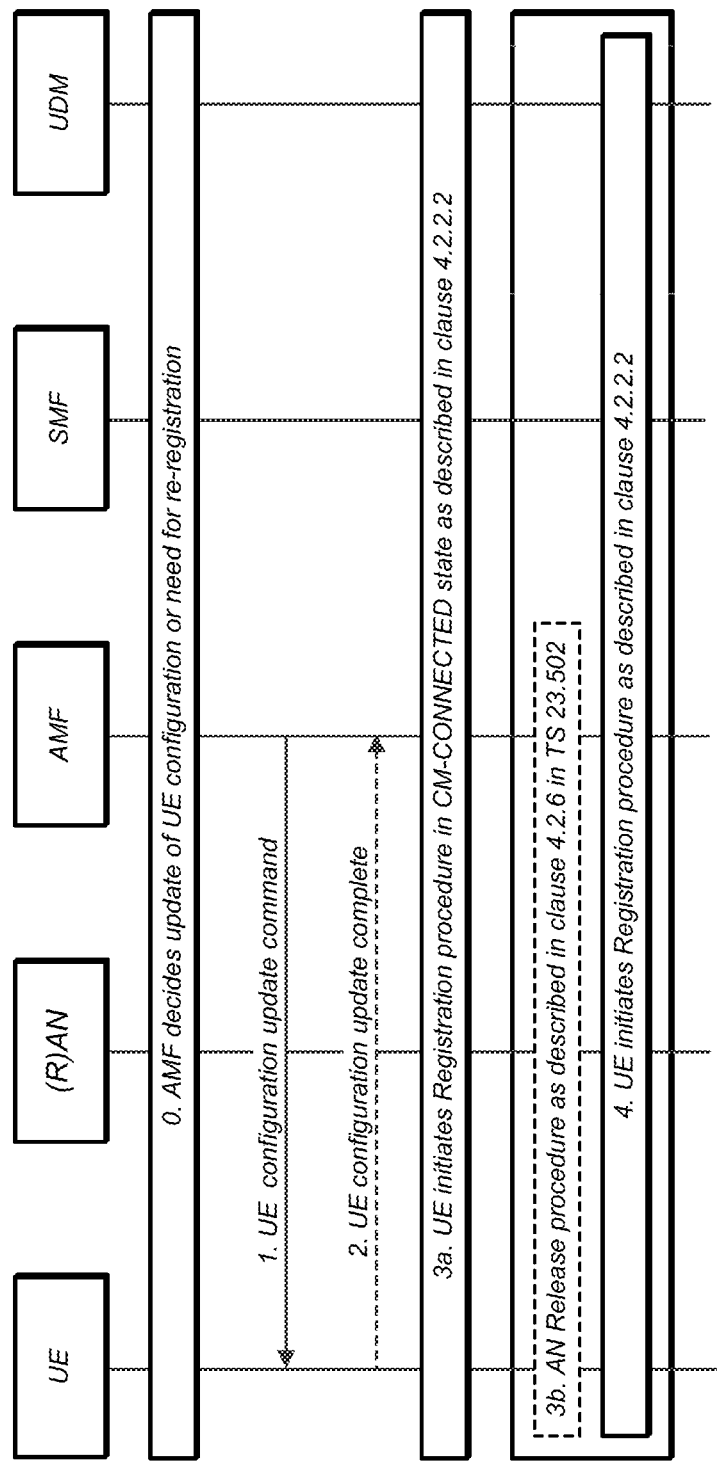

FIG. 12: UE Configuration Update procedure for access and mobility management related parameters.

0. AMF determines the necessity of UE configuration change due to various reasons (e.g. UE mobility change, NW policy, UE subscription change, 5G-GUTI expiry) or that the UE needs to perform a Registration Procedure. If a UE is in CM-IDLE, the AMF may trigger Network Triggered Service Request (in clause 4.2.3.4). The AMF may include Handover Restriction List in N2 message that delivers UE Configuration Update command to the UE if the service area restriction for the UE is updated.

1. The AMF may send UE Configuration Update command containing UE parameter (5G-GUTI, TAI List, Allowed NSSAI, NITZ, Mobility Restrictions, LADN Information, MICO, whether or not the current 5G-GUTI is valid, Configuration Update Indication) to UE. The AMF may include one or some of 5G-GUTI, TAI List, Allowed NSSAI, NITZ (Network Identity and Time Zone), Mobility Restrictions parameters or LADN Information if the AMF wants to update these NAS parameters without triggering UE re-registration. The AMF may include in the UE Configuration Update Command also a Configuration Update Indication parameter indicating whether:—The UE shall acknowledge the command and A re-registration is requested.

2. If the UE Configuration Update Indication requires acknowledgement of the UE Configuration Update Command, then the UE may send a UE Configuration Update complete message to the AMF. The AMF should request acknowledgement for all UE Configuration Updates, except for NITZ.

3a. If the Configuration Update Indication requires a re-registration procedure and MICO is included in the UE Configuration Update Command message, UE may initiate a Registration procedure after the acknowledgement immediately to re-negotiated MICO mode with the network. Step 3b and step 4 may be skipped.

3b. If the Configuration Update Indication requires a re-registration procedure, an Allowed NSSAI and an indication that the current 5G-GUTI is invalid may be included in the UE Configuration Update Command message, AMF may release the NAS signalling connection for the UE after receiving the acknowledgement in step 2. Step 3a may be skipped for this condition.

4. UE may initiate a Registration including SUPI in the Registration Request message after the UE enters CM-IDLE state. Receiving UE Configuration Update command without an indication requesting to perform re-registration, can still trigger Registration Update procedure by the UE for other reasons.

Namf_Communication_UEContextTransfer service operation.

Service operation name: Namf_Communication_UEContextTransfer

Description: Provides the UE context to the consumer NF.

Input, Required: 5G-GUTI, Reason.

Input, Optional: Integrity protected message from the UE that triggers the context transfer.

Output, Required: The UE context of the identified UE. The UE context is detailed in table 5.2.2.2-1.

Output, Optional: Mobile Equipment Identifier (if available), Allowed NSSAI, Mapping Of Allowed NSSAI. See clause 4.2.2.2.2 for example of usage of this service operation. If the consumer NF sent an integrity protected message from the UE, the AMF may use it to verify whether this request is permitted to retrieve the UE context of the UE. If it is permitted, the AMF may provide UE context to the consumer NF in the Namf_Communication_UEContextTransfer response.

Based on 3GPP agreements, 5G-GUTI reallocation may be controlled by the network.

TS 23.501 15.2.0:

The AMF shall allocate a 5G Globally Unique Temporary Identifier (5G-GUTI) to the UE that is common to both 3GPP and non-3GPP access. It shall be possible to use the same 5G-GUTI for accessing 3GPP access and non-3GPP access security context within the AMF for the given UE. An AMF may re-assign a new 5G-GUTI to the UE at any time. The AMF may delay updating the UE with its new 5G-GUTI until the next NAS transaction.

TS 24.501 15.0.0:

A UE supporting N1 mode includes a valid 5G-GUTI, if any is available, in the REGISTRATION REQUEST and DEREGISTRATION REQUEST messages. In the SERVICE REQUEST message, the UE includes a valid 5G-S-TMSI as user identity. The AMF may assign a new 5G-GUTI for a particular UE at successful registration and generic UE configuration update procedures.

If a new 5G-GUTI is assigned by the AMF, the UE and the AMF handle the 5G-GUTI as follows:

a) Upon receipt of a 5GMM message containing a new 5G-GUTI the UE considers the new 5G-GUTI as valid and the old 5G-GUTI as invalid, stops timer T3519 if running, and deletes any stored SUCI. The new 5G-GUTI is stored in a non-volatile memory in the USIM if the corresponding file is present in the USIM, else in the non-volatile memory in the ME, as described in annex C.

b) The AMF considers the old 5G-GUTI as invalid as soon as an acknowledgement for a registration or generic UE configuration update procedure is received.

If the UE receives a new 5G-GUTI in the CONFIGURATION UPDATE COMMAND message, the UE shall consider the new 5G-GUTI as valid, the old 5G-GUTI as invalid, stop timer T3519 if running, and delete any stored SUCI; otherwise, the UE shall consider the old 5G-GUTI as valid.

TS 33.501 15.1.0:

The AMF shall support assigning 5G-GUTI to the UE.

The AMF shall support reallocating 5G-GUTI to UE.

A new 5G-GUTI shall be sent to a UE only after a successful activation of NAS security. The 5G-GUTI is defined in TS 23.003 [19].

Upon receiving Registration Request message of type "initial registration" or "mobility registration update" from a UE, the AMF shall send a new 5G-GUTI to the UE in Registration Accept message.

Upon receiving Registration Request message of type "periodic registration update" from a UE, the AMF should send a new 5G-GUTI to the UE in Registration Accept message.

Exemplary Embodiments

The following paragraphs illustrate exemplary embodiments described herein.

In one embodiment, a method, may include, by a UE: receiving a first global unique temporary ID (GUTI) from a network node; initiating a timer associated with the first GUTI upon receiving the first GUTI; upon expiry of the timer, transmitting a message requesting a new GUTI to the network node; and in response to transmitting the message requesting the new GUTI, receiving a second GUTI.

In some embodiments, the message requesting the new GUTI comprises a status message.

In some embodiments, the message requesting the new GUTI comprises a configuration update request message.

In some embodiments, the second GUTI is received in a configuration update command from the network node.

In one embodiment, a method may include, by a network node: receiving a registration request message from a UE; providing a first global unique temporary ID (GUTI) to the UE; upon expiry of a timer associated with the GUTI, receiving a message requesting a new GUTI from the UE; and in response to receiving the message requesting the new GUTI, transmitting a second GUTI to the UE.

In some embodiments, the message requesting the new GUTI comprises a status message.

In some embodiments, the message requesting the new GUTI comprises a configuration update request message.

In some embodiments, the second GUTI is transmitted in a configuration update command.

In one embodiment, a method may include, by a network node: receiving a registration request message from a UE, wherein the registration request message indicates a first value for a timer corresponding to one or more global unique temporary IDs (GUTIs); providing a first global unique temporary ID (GUTI) to the UE; receiving an acknowledgement from the UE; beginning the timer upon receiving the acknowledgement from the UE; and upon expiry of the timer, transmitting a second GUTI to the UE.

In some embodiments, the second GUTI is transmitted in a configuration update command.

In some embodiments, providing the first GUTI to the UE indicates the first value for the timer.

In some embodiments, providing the first GUTI to the UE indicates a second value for the timer that is different from the first value, wherein the second value is used for transmitting the second GUTI to the UE.

In one embodiment, a method includes, by a UE: determining a first value for a timer corresponding to one or more global unique temporary IDs (GUTIs); providing a registration request message to a network node, wherein the registration request message indicates the first value for the timer; receiving a first global unique temporary ID (GUTI) from the network node in response to providing the registration request message; providing an acknowledgement from the network node; and upon expiry of the timer, receiving a second GUTI from the network node.

In some embodiments, the second GUTI is transmitted in a configuration update command.

In some embodiments, receiving the first GUTI from the network node indicates the first value for the timer.

In some embodiments, said receiving the first GUTI from the network node indicates a second value for the timer that is different from the first value, wherein the second value is used for transmission of the second GUTI to the UE.

In some embodiments, a device may include: an antenna; a radio coupled to the antenna; and a processing element coupled to the radio; and may be configured to implement any embodiments described herein.

In some embodiments, a memory medium comprising program instructions that, when executed, cause a device to implement any embodiments described herein.

In some embodiments, an apparatus, comprising: a memory; and at least one processor in communication with the memory may be configured to implement any embodiments described herein In some embodiments, a method may include any action or combination of actions as substantially described herein in the Detailed Description and claims.

In some embodiments, a method may include any embodiments as substantially described herein with reference to each or any combination of the Figures contained herein, with reference to each or any combination of paragraphs in the Detailed Description, with reference to each or any combination of Figures and/or Detailed Description, or with reference to each or any combination of the claims.

In some embodiments, a wireless device may be configured to perform any action or combination of actions as substantially described herein in the Detailed Description, Figures, and/or claims.

In some embodiments, a wireless device may include any component or combination of components as described herein in the Detailed Description and/or Figures as included in a wireless device.

In some embodiments, a non-volatile computer-readable medium may store instructions that, when executed, cause the performance of any action or combination of actions as substantially described herein in the Detailed Description and/or Figures.

In some embodiments, an integrated circuit may be configured to perform any action or combination of actions as substantially described herein in the Detailed Description and/or Figures.

In some embodiments, a mobile station may be configured to perform any action or combination of actions as substantially described herein in the Detailed Description and/or Figures.

In some embodiments, a mobile station may include any component or combination of components as described herein in the Detailed Description and/or Figures as included in a mobile station.

In some embodiments, a mobile device may be configured to perform any action or combination of actions as substantially described herein in the Detailed Description and/or Figures.

In some embodiments, a mobile device may include any component or combination of components as described herein in the Detailed Description and/or Figures as included in a mobile device.

In some embodiments, a network node may be configured to perform any action or combination of actions as substantially described herein in the Detailed Description and/or Figures.

In some embodiments, a network node may include any component or combination of components as described herein in the Detailed Description and/or Figures as included in a mobile device.

In some embodiments, a base station may be configured to perform any action or combination of actions as substantially described herein in the Detailed Description and/or Figures.

In some embodiments, a base station may include any component or combination of components as described herein in the Detailed Description and/or Figures as included in a mobile device.

In some embodiments, a 5G NR network node or base station may be configured to perform any action or combination of actions as substantially described herein in the Detailed Description and/or Figures.

In some embodiments, a 5G NR network node or base station may include any component or combination of components as described herein in the Detailed Description and/or Figures as included in a mobile device.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer accessible memory medium storing program instructions executable by a processor of a user equipment (UE) to:
   perform a registration procedure through a first message exchange with an access mobility function (AMF), wherein performing the registration procedure includes:

receiving a first fifth generation (5G) global unique temporary identifier (GUTI) from the AMF; and
negotiating a timer having a timer value;
start the timer after completion of the registration procedure;
transition in and out of connected mode at least once while the timer is running;
after a first period of time according to the timer value, perform a second message exchange with the AMF, wherein said performing the second message exchange includes receiving a second GUTI from the network node AMF.

2. The non-transitory computer accessible memory medium of claim 1, wherein the connected mode comprises a 5G mobility management connected mode.

3. The non-transitory computer accessible memory medium of claim 1, wherein said performing the second message exchange is performed while the UE is in connected mode.

4. The non-transitory computer accessible memory medium of claim 1, wherein said performing the second message exchange is performed upon entering connected mode after expiry of the timer.

5. The non-transitory computer accessible memory medium of claim 1, wherein said performing the second message exchange includes transmitting a status message.

6. The non-transitory computer accessible memory medium of claim 1, wherein said performing the second message exchange includes transmitting a configuration update request message.

7. The non-transitory computer accessible memory medium of claim 1, wherein the second 5G-GUTI is received in a configuration update command from the AMF.

8. An apparatus, comprising:
at least one processing element, wherein the at least one processing element is configured to cause a user equipment (UE) to:
perform a registration procedure through a first message exchange with an access mobility function (AMF), wherein performing the registration procedure includes:
receiving a first fifth generation (5G) global unique temporary identifier (GUTI) from the AMF; and
negotiating a timer having a timer value;
start the timer after completion of the registration procedure;
transition in and out of connected mode at least once while the timer is running;
after a first period of time according to the timer value, perform a second message exchange with the AMF, wherein said performing the second message exchange includes receiving a second GUTI from the AMF.

9. The apparatus of claim 8, wherein the connected mode comprises a 5G mobility management connected mode.

10. The apparatus of claim 8, wherein said performing the second message exchange is performed while the UE is in connected mode.

11. The apparatus of claim 8, wherein said performing the second message exchange is performed upon entering connected mode after expiry of the timer.

12. The apparatus of claim 8, wherein said performing the second message exchange includes transmitting a status message.

13. The apparatus of claim 8, wherein said performing the second message exchange includes transmitting a configuration update request message.

14. The apparatus of claim 8, wherein the second 5G-GUTI is received in a configuration update command from the AMF.

15. A wireless device, comprising:
an antenna;
a radio coupled to the antenna; and
one or more processors coupled to the radio, wherein the one or more processors are configured to:
perform a registration procedure through a first message exchange with an access mobility function (AMF), wherein performing the registration procedure includes:
receiving a first fifth generation (5G) global unique temporary identifier (GUTI) from the AMF; and
negotiating a timer having a timer value;
start the timer after completion of the registration procedure;
transition in and out of connected mode at least once while the timer is running;
after a first period of time according to the timer value, perform a second message exchange with the AMF, wherein said performing the second message exchange includes receiving a second GUTI from the AMF.

16. The wireless device of claim 15, wherein said performing the second message exchange is performed while the wireless device is in connected mode.

17. The wireless device of claim 15, wherein said performing the second message exchange is performed upon entering connected mode after expiry of the timer.

18. The wireless device of claim 15, wherein said performing the second message exchange includes transmitting a status message.

19. The wireless device of claim 15, wherein said performing the second message exchange includes transmitting a configuration update request message.

20. The wireless device of claim 15, wherein the second 5G-GUTI is received in a configuration update command from the AMF.

* * * * *

UNITED STATES PATENT AND TRADEMARK OFFICE
CERTIFICATE OF CORRECTION

PATENT NO. : 11,259,354 B2
APPLICATION NO. : 16/995296
DATED : February 22, 2022
INVENTOR(S) : Shivani Suresh Babu et al.

It is certified that error appears in the above-identified patent and that said Letters Patent is hereby corrected as shown below:

In the Claims

Column 41, Lines 11 and 12, Claim 1, delete "network node"

Signed and Sealed this
Thirtieth Day of May, 2023

Katherine Kelly Vidal
*Director of the United States Patent and Trademark Office*